United States Patent
Du et al.

(10) Patent No.: US 11,815,087 B2
(45) Date of Patent: Nov. 14, 2023

(54) AUTOMATIC SYSTEM AND METHOD FOR DISASSEMBLY AND ASSEMBLY OF PLUNGER PUMPS

(71) Applicant: YANTAI JEREH PETROLEUM EQUIPMENT & TECHNOLOGIES CO., LTD., Yantai (CN)

(72) Inventors: Ruijie Du, Yantai (CN); Liang Lv, Yantai (CN); Shanwu Fu, Yantai (CN); Sheng Chang, Yantai (CN); Jifeng Zhong, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 0 days.

(21) Appl. No.: 17/883,192

(22) Filed: Aug. 8, 2022

(65) Prior Publication Data

US 2023/0109018 A1     Apr. 6, 2023

(30) Foreign Application Priority Data

Sep. 27, 2021   (CN) .......................... 202111134222.9

(51) Int. Cl.
*F04B 53/22*      (2006.01)
*B23P 6/00*       (2006.01)
(Continued)

(52) U.S. Cl.
CPC ................ *F04B 53/22* (2013.01); *B23P 6/00* (2013.01); *B23P 19/04* (2013.01); *B25J 11/005* (2013.01);
(Continued)

(58) Field of Classification Search
CPC ...... F04B 53/22; B23P 15/001; B23P 19/048; B23P 19/04; B23P 6/00; B23P 15/00;
(Continued)

(56) References Cited

U.S. PATENT DOCUMENTS 4,580,941 A * 4/1986 Inaba ....................... B25J 15/04
                                              414/730
9,841,017 B1 * 12/2017 Blood ..................... F04B 53/22
(Continued)

FOREIGN PATENT DOCUMENTS

AU      2021101433 A4   5/2021
CN        201175889 Y   1/2009
(Continued)

OTHER PUBLICATIONS

Translation of CN-108715403-A (Year: 2018).*
(Continued)

*Primary Examiner* — Matthew P Travers

(57) ABSTRACT

Automatic disassembly and assembly system and method for plunger pumps are disclosed. The system includes a plurality of working members, a first robotic arm, a first driver and a second driver. The working members include a rotary puller, a lever, and a gripper; the first robotic arm includes a working end and a connection end, the working end of the first robotic arm is respectively detachably connectable with the plurality of working members; the first driver is connected with the connection end of the first robotic arm and drives the first robotic arm to move in a three-dimensional space; the second driver drives the working member connected with the working end to operate.

17 Claims, 12 Drawing Sheets

(51) Int. Cl.
  *B23P 19/04* (2006.01)
  *B25J 11/00* (2006.01)
  *B25J 15/00* (2006.01)
  *B25J 15/04* (2006.01)
(52) U.S. Cl.
  CPC ........ *B25J 15/0019* (2013.01); *B25J 15/0066* (2013.01); *B25J 15/04* (2013.01)
(58) Field of Classification Search
  CPC .. B25J 11/005; B25J 15/0019; B25J 15/0052; B25J 15/0066; B25J 15/04; B25J 15/0047; Y10T 29/49238
  See application file for complete search history.

(56) References Cited

U.S. PATENT DOCUMENTS

| | | | |
|---|---|---|---|
| 2014/0094961 A1 | 4/2014 | Zhao | |
| 2018/0326582 A1* | 11/2018 | Yokoyama | B25J 9/1674 |
| 2019/0046283 A1* | 2/2019 | Nagao | B25J 19/0004 |
| 2020/0108497 A1* | 4/2020 | Miyazaki | B25J 9/08 |

FOREIGN PATENT DOCUMENTS

| | | | |
|---|---|---|---|
| CN | 103707025 A | | 4/2014 |
| CN | 106272488 A | * | 1/2017 |
| CN | 207448354 U | | 6/2018 |
| CN | 108237529 A | | 7/2018 |
| CN | 108715403 A | * | 10/2018 |
| CN | 109408552 A | | 3/2019 |
| CN | 110587575 A | | 12/2019 |
| CN | 210100015 U | | 2/2020 |
| CN | 112507785 A | | 3/2021 |
| CN | 112814584 A | | 5/2021 |
| CN | 112875316 A | | 6/2021 |
| CN | 112922827 A | | 6/2021 |
| CN | 213615173 U | | 7/2021 |
| CN | 113256443 A | | 8/2021 |
| CN | 113609932 A | | 11/2021 |
| CN | 216398626 U | | 4/2022 |
| JP | 2020059115 A | | 4/2020 |
| WO | 2020069224 A1 | | 4/2020 |

OTHER PUBLICATIONS

Translation of CN-106272488-A (Year: 2017).*
Translation of CN 213615173 (Year: 2021).*
Written Opinion and International Search Report for PCT Application No. PCT/CN2021/124413 dated Jun. 30, 2022.
Written Opinion and International Search Report for PCT Application No. PCT/CN2022/090145 dated Aug. 5, 2022.

* cited by examiner

AUTOMATIC SYSTEM AND METHOD FOR DISASSEMBLY AND ASSEMBLY OF PLUNGER PUMPS

The application claims priority to the Chinese patent application No. 202111134222.9, filed on Sep. 27, 2021, the entire content of which is incorporated herein by reference.

TECHNICAL FIELD

At least one embodiment of the present disclosure relates to an automatic system for disassembly and assembly of plunger pumps, and an automatic disassembly and assembly method for plunger pumps.

BACKGROUND

Particles such as pressurizing materials are easily retained among the components at the hydraulic end of a plunger pump, which requires routine maintenance inspection and if necessary, replacement of the components at the hydraulic end of the plunger pump. When replacing the components at the hydraulic end of plunger pump, it is necessary to disassemble and assemble the hydraulic end. The traditional method requires multiple people to cooperate manually and takes a long time to replace the components, especially replacing the valve seat spring sleeve, the valve seat, and the plunger, which is time-consuming and laborious. In addition, in the process of manually replacing the components at the hydraulic end, safety accidents such as hurting feet by the components and waist sprain may easily occur.

SUMMARY

At least one embodiment of the present disclosure provides an automatic system for disassembly and assembly of plunger pumps. The automatic system for disassembly and assembly of plunger pumps includes a plurality of working members, a first robotic arm, a first driver and a second driver. The plurality of working members, including a rotary puller, a lever, and at least one gripper; the first robotic arm includes a working end and a connection end opposite to the working end, the working end of the first robotic arm is configured to be detachably connectable with each of the plurality of working members; the first driver is connected with the connection end of the first robotic arm and configured to drive the first robotic arm to move in a three-dimensional space; and the second driver is configured to drive the working member connected with the working end to operate.

In some embodiments, in the automatic system for disassembly and assembly of plunger pumps, the plunger pump includes a hydraulic end, the hydraulic end includes a first cavity and a plurality of first function components in the first cavity, the automatic system for disassembly and assembly of plunger pumps further includes a control system, the control system is respectively communicatively connected with the first driver and the second driver; the control system is configured to control the first driver to drive the first robotic arm to move in an extension direction of the first cavity, and to control the first robotic arm to drive the plurality of working members to enter the first cavity and respectively be in matched connection with the plurality of first function components in the first cavity, so as to disassemble or assemble the plurality of first function components in the first cavity.

In some embodiments, in the automatic system for disassembly and assembly of plunger pumps, the hydraulic end further includes a second cavity and a plurality of second function components in the second cavity; the control system is configured to control the first driver to drive the first robotic arm to move in an extension direction of the second cavity, and to control the first robotic arm to drive the plurality of working members to enter the second cavity and respectively be in matched connection with the plurality of second function components in the second cavity, so as to disassemble or assemble the plurality of second function components in the second cavity.

In some embodiments, in the automatic system for disassembly and assembly of plunger pumps, the lever includes a lever and a rod-shape branch. The lever includes a lever body and a lever connection portion, the lever body includes a first end detachably connectable with the working end of the first robotic arm and a second end opposite to the first end of the lever body, and the lever connection portion is connected with the second end of the lever body; the rod-shape branch is connected with the lever body, extends in a direction perpendicular to an extension direction of the lever body and includes a branch body and a spring compression portion; the branch body includes a first end connected with the lever body and a second end opposite to the first end of the branch body, the spring compression portion is connected with the second end of the branch body, the spring compression portion has a pressure-exerting face away from the lever body, and the second driver includes a lever driver configured to drive the lever into a lever motion so as to drive the pressure-exerting face to move.

In some embodiments, in the automatic system for disassembly and assembly of plunger pumps, the second end of the lever body has a first end face away from the first robotic arm, the lever connection portion is on the first end face and has a same extension direction as an extension of the lever body, and a size of, a cross section of the lever connection portion parallel to the first end face, is smaller than that of the first end face so that a first step structure is at the position where the lever connection portion is connected with the lever body; the second end of the branch body has a second end face away from the lever body, the second end of the branch body constitutes the spring compression portion, and the second end face constitutes the pressure-exerting face of the spring compression portion.

In some embodiments, in the automatic system for disassembly and assembly of plunger pumps, the spring compression portion is on the second end face, and a size of, a cross section of the spring compression portion parallel to the second end face, is smaller than that of the second end face so that a second step structure is at a position where the spring compression portion is connected with the branch body.

In some embodiments, the automatic system for disassembly and assembly of plunger pumps further includes a second robotic arm, the second robotic arm includes a working end and a connection end opposite to the working end of the second robotic arm; the at least one gripper includes a first gripper detachably connectable with the working end of the second robotic arm; the second driver includes a gripping driver configured to drive the first gripper to perform a gripping operation while the first robotic arm drives the lever to work.

In some embodiments, in the automatic system for disassembly and assembly of plunger pumps, the plurality of working members further includes a puller including a pulling body, and a first pulling portion and a second pulling portion that are connected with the pulling body; the pulling body is configured to be detachably connectable with the working end of the first robotic arm, the first pulling portion has a first end connected with the pulling body and a second end away from the pulling body, the second pulling portion has a first end connected with the pulling body and a second end away from the pulling body, and the first end of the first pulling portion and the first end of the second pulling portion are spaced apart from each other; the second end of the first pulling portion has a first hook portion bent in a direction away from the second pulling portion, and the second end of the second pulling portion has a second hook portion bent in a direction away from the first pulling portion; the second driver includes a pulling driver configured to drive the puller to move.

In some embodiments, in the automatic system for disassembly and assembly of plunger pumps, the rotary puller includes a rotation pulling body and a rod-shape rotation pulling connection portion connected with the rotation pulling body, and the rotation pulling body is configured to be detachably connectable with the working end of the first robotic arm; the second driver further includes a rotation driver and a pulling driver. The rotation driver is configured to drive the rotation pulling body and the rod-shape rotation pulling connection portion to rotate; the pulling driver, configured to drive the rotary puller to move.

In some embodiments, in the automatic system for disassembly and assembly of plunger pumps, the plurality of working members further include a push-pull member, wherein the push-pull member includes a push-pull body, a push-pull connection portion and a push-pull portion. The push-pull body is configured to be detachably connectable with the working end of the robotic arm; the push-pull connection portion has a first end connected with the push-pull body and a second end away from the push-pull body; and the push-pull portion is connected with the push-pull connection portion; a direction from the first end of the push-pull connection portion to a second end of the push-pull connection portion is an extension direction of the push-pull connection portion, and the push-pull portion extends beyond the push-pull connection portion in a direction perpendicular to the extension direction of the push-pull connection portion; the second driver includes a push-pull driver configured to drive the push-pull member to move.

In some embodiments, the automatic system for disassembly and assembly of plunger pumps further includes a third robotic arm, the third robotic arm includes a working end and a connection end opposite to the working end; a position of the connection end of the third robotic arm is different from a position of the connection end of the first robotic arm, and the working end of the third robotic arm is configured to be detachably connectable with each of the plurality of working members, and is configured to drive the working member connected with the working end of the third robotic arm to operate.

In some embodiments, the automatic system for disassembly and assembly of plunger pumps further includes a detector, the detector is configured to acquire an operation state of the first function component or the second function component and determine whether the first function component or the second function component needs to be disassembled according to the operation state; the control system includes a loading control module configured to, in the case where the first function component or the second function component needs to be disassembled, control the working end of the first robotic arm to be detachably connected with the working member which is in matched connection with the first function component or the second function component that needs to be disassembled.

In some embodiments, in the automatic system for disassembly and assembly of plunger pumps, the detector includes an image sensor device and a judgment module; the image sensor device is arranged at the working end of the first robotic arm, and is configured to acquire an image of the first function component or the second function component and transmit the image to the judgement module; the judgment module determines whether the first function component or the second function component needs to be disassembled according to the image.

In some embodiments, the automatic system for disassembly and assembly of plunger pumps further includes an over-torque protection device which is communicatively connected with the control system and configured to acquire a torque value generated upon rotation of the rotary puller and send the torque value to the control system; the control system includes a processing module that receives the torque value and sends out an over-torque warning signal when the torque value reaches a torque warning value, and controls the over-torque protection device to drive the rotary puller to stop rotating.

In some embodiments, the automatic system for disassembly and assembly of plunger pumps further includes a pulling protection device which is communicatively connected with the control system and configured to acquire a pulling force value generated by at least one of the puller and the rotary puller during operation; when the pulling force value reaches a pulling force warning value, the pulling protection device sends out a pulling force warning signal and controls the at least one of the puller and the rotary puller to stop working.

At least one embodiment of the present disclosure provides an automatic disassembly and assembly method for plunger pumps, and the automatic disassembly and assembly method for plunger pumps includes: driving a first robotic arm to move in a three-dimensional space by a first driver, in which the first robotic arm includes a working end and a connection end opposite to the working end, the first driver is connected with the working end of the first robotic arm, and the working end of the first robotic arm is configured to be respectively detachably connectable with each of a plurality of working members; and driving the working members connected with the working end to operate by a second driver, wherein the plurality of working members include a rotary puller, a lever and at least one gripper.

In some embodiments, in the automatic disassembly and assembly method for plunger pumps, the plunger pump includes a hydraulic end, and the hydraulic end includes a function mechanism and a first cavity. The function mechanism includes a plurality of first function components; and the plurality of first function components are in the first cavity; the method further includes: controlling, by a control system, the first driver to drive the first robotic arm to move in an extension direction of the first cavity, and controlling the first robotic arm to drive the plurality of working members to enter the first cavity and be in matched connection with the plurality of first function components in the first cavity, so as to disassemble or assemble the plurality of first function components in the first cavity.

In some embodiments, in the automatic disassembly and assembly method for plunger pumps, the function mechanism further includes a plurality of second function components, the hydraulic end further includes a second cavity, and the plurality of second function components are in the second cavity, the method further includes: controlling, by the control system, the first driver to drive the first robotic arm to move in the extension direction of the second cavity, and controlling the first robotic arm to drive the plurality of working members into the second cavity and be in matched connection with the plurality of second function components in the second cavity, respectively so as to disassemble or assemble the plurality of second function components in the second cavity.

In some embodiments, in the automatic disassembly and assembly method for plunger pumps, the plunger pump includes a plurality of cylinders, and each of the plurality of cylinders includes the first cavity and/or the second cavity, the method further includes: determining a target cylinder of which the function component needs to be replaced from the plurality of cylinders, and determining the target function component that needs to be replaced in the target cylinder; selecting a target working member that matches the target function component from the plurality of working members, and detachably connecting the target working member with the working end of the first robotic arm; controlling, by the control system, the movement of the first robotic arm to drive the target working member to move to a position of the target function component, and driving, by the second driver, the target working member to move and be in matched connection with the target function component, so as to disassemble the target function component.

In some embodiments, the automatic disassembly and assembly method for plunger pumps further includes: acquiring an image of the working component, and determining the target cylinder and the target function component according to the image.

In some embodiments, in the automatic disassembly and assembly method for plunger pumps, in an operation state of the plunger pump, the function mechanism includes: a plunger, a valve spring seat sleeve, a first valve spring seat, and a first valve spring. The plunger extends in a transverse direction; the valve spring seat sleeve is on a side of the plunger in the transverse direction and having a hollow shell; the first valve spring seat is detachably connected with the valve spring seat and on a side of the hollow shell in a longitudinal direction, the longitudinal direction is perpendicular to the transverse direction; and the first valve spring is sleeved on the first valve spring seat and retractable in the longitudinal direction; the second driver includes a lever driver, and the lever includes: a lever and a rod-shape branch. The lever includes a lever body and a lever connection portion, the lever body includes a first end detachably connectable with the working end of the first robotic arm and a second end opposite the first end of the lever body, and the lever connection portion is connected with the second end of the lever body; and the rod-shape branch is connected with the lever body, extends in a vertical direction perpendicular to an extension direction of the lever body, and includes a branch body and a spring compression portion, wherein the branch body includes a first end connected with the lever body and a second end opposite to the first end of the branch body, and the spring compression portion is connected with the second end of the branch body, and has a pressure-exerting face away from the lever body; the method includes: detachably connecting the lever with the working end of the first robotic arm; controlling, by the control system, the first robotic arm to drive the lever to move so that the lever body passes through the hollow shell of the valve spring seat sleeve, in which the lever connection portion is connected with the plunger, and the rod-shape branch passes through the hollow shell of the valve spring seat sleeve in the vertical direction perpendicular to the extension direction of the lever body; and driving, by the lever driver, the lever connection portion to perform a lever motion with a position where the lever connection portion connects with the plunger as a fulcrum to drive the pressure-exerting face to move in the longitudinal direction to press the first valve spring seat and the first valve spring in the longitudinal direction, so as to make the first valve spring seat move in the longitudinal direction and compress the first valve spring in the longitudinal direction, so that the valve spring seat sleeve is separated from the first valve spring seat; the at least one gripper includes a first gripper, and the second driver includes a gripping driver; the method further includes: detachably connecting the first gripper with the working end of the second robotic arm; and while the pressure-exerting face presses the first valve spring seat and the first valve spring in the longitudinal direction, driving, by the gripping driver, the first gripper to grip the valve spring seat sleeve, and driving, by the second robotic arm, the first gripper to move the valve spring seat sleeve out of the hydraulic end.

In some embodiments, in the automatic disassembly and assembly method for plunger pumps, the first cavity and the second cavity intersect and communicate, the first cavity extends in the transverse direction, the second cavity extends in the longitudinal direction, the first cavity has a first end and a second end that are opposite to each other in the transverse direction, and the second cavity has a first end and a second end that are opposite to each other in the longitudinal direction; in the operation state of the plunger pump, the second function components include: a second pressure nut, the valve spring seat sleeve, the first valve spring seat, and the first valve spring. The second pressure nut is at the first end of the second cavity; the valve spring seat sleeve is clamped at an intersection of the first cavity and the second cavity, the hollow shell has a right opening facing the first end of the first cavity, a left opening facing the second end of the first cavity and a lower opening facing the second end of the second cavity; the first valve spring seat is on a side of the hollow shell having the lower opening, and has a through hole passing through the first valve spring seat along the longitudinal direction; the through hole communicates with the lower opening of the valve spring seat sleeve; the lever enters into the intersection of the first cavity and the second cavity via the first end of the first cavity, the lever body passes through the hollow shell sequentially via the right opening and the left opening of the hollow shell so that the lever connection portion connects with the plunger, and the rod-shape branch passes through the lower opening of the valve spring seat sleeve in the longitudinal direction.

In some embodiments, the automatic disassembly and assembly method for plunger pumps further includes: acquiring an operation state of the function mechanism at the hydraulic end and determining whether the function mechanism needs to be disassembled according to the operation state of the function mechanism; and in the case where the function component needs to be disassembled, detachably connecting the working member, that matches with the function mechanism that needs to be disassembled, with the working end of the first robotic arm.

In some embodiments, in the automatic disassembly and assembly method for plunger pumps, the second driver further includes a rotation driver; the method further includes: driving the rotary puller to rotate by the rotation driver; and acquiring a torque value generated by the rotary puller when the rotary puller rotates, wherein when the torque value reaches a torque warning value, an over-torque warning signal is sent out and the rotary puller is controlled to stop rotating.

BRIEF DESCRIPTION OF THE DRAWINGS

In order to clearly illustrate the technical solution of the embodiments of the disclosure, the drawings of the embodiments will be briefly described in the following. The described drawings are only related to some embodiments of the disclosure and thus are not limitative of the disclosure.

DETAILED DESCRIPTION

Figure 1A:
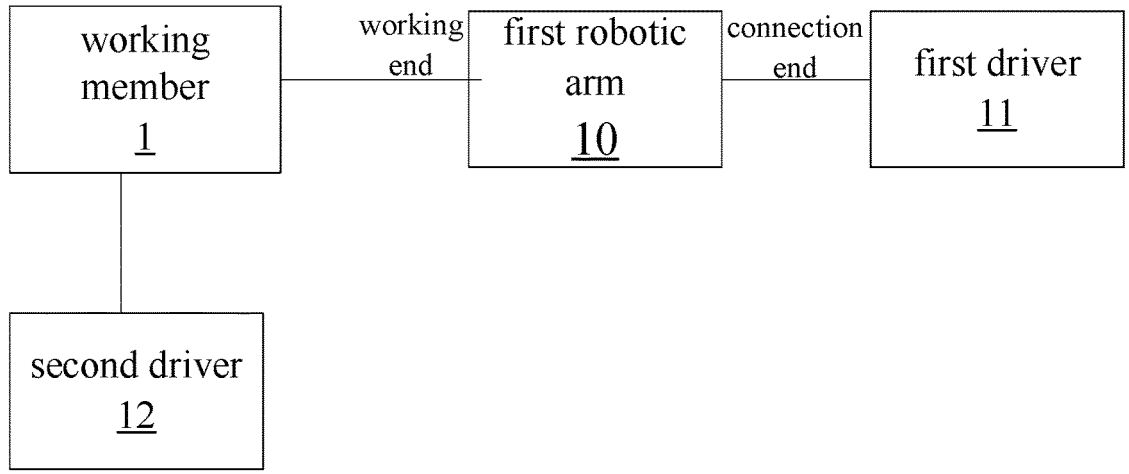
FIG. 1A is a schematic view of an automatic disassembly and assembly system for plunger pumps, provided by at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "Inside," "outside," "on," "under" and the like are only used to indicate relative position relationship, and when the position of the object which is described is changed, the relative position relationship may be changed accordingly.

The drawings in the present disclosure are not drawn to exact scale, nor is the number of robotic arms limited to the number shown in the drawings, and the specific dimensions and number of each structure may be determined according to actual needs. The drawings described in the present disclosure are only schematic structural illustrations.

At least one embodiment of the present disclosure provides an automatic system for disassembly and assembly of plunger pumps. The system includes a plurality of working members, a first robotic arm, a first driver, and a second driver. The plurality of working members include a rotary puller, a lever, and at least one gripper; the first robotic arm includes a working end and a connection end opposite to the working end, the working end of the first robotic arm is configured to be detachably connectable with each of the plurality of working members; the first driver is connected with the connection end of the first robotic arm and configured to drive the first robotic arm to move in a three-dimensional space; the second driver is configured to drive the working member connected with the working end to operate.

Figure 1B:
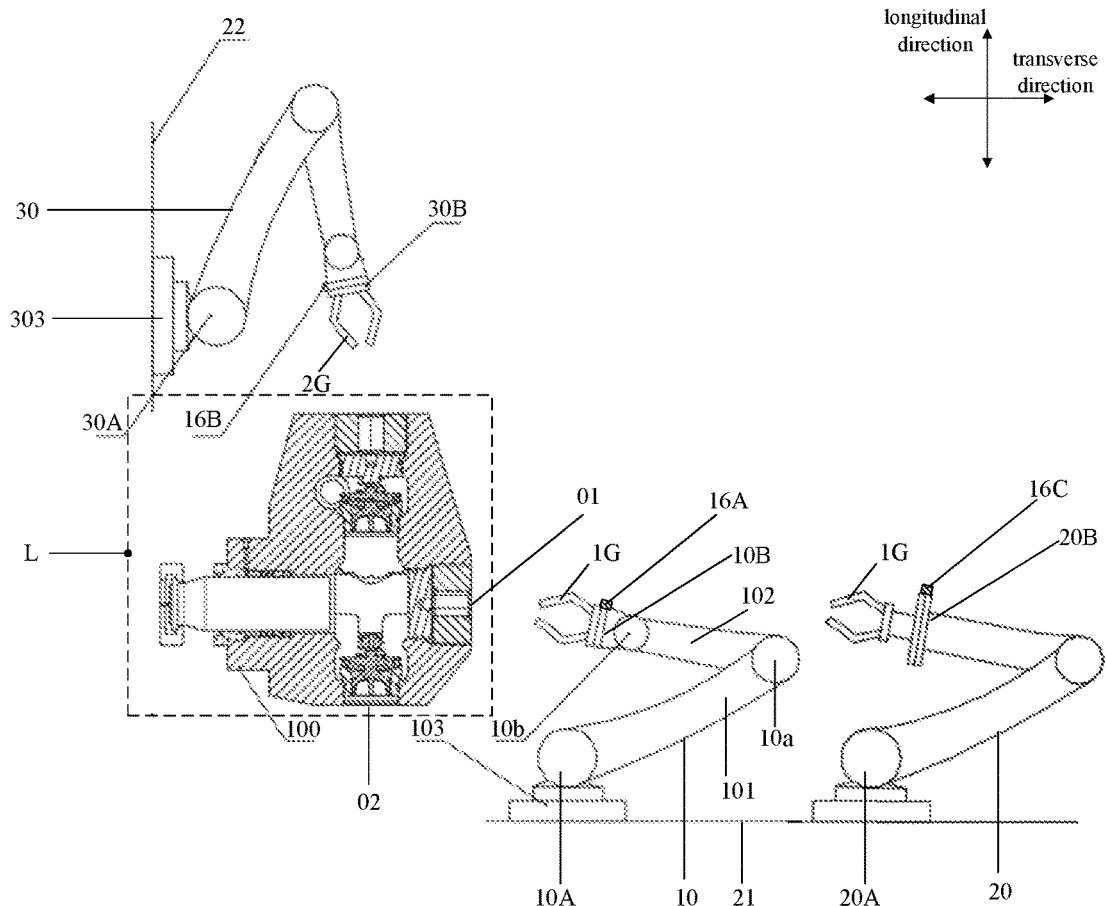
FIG. 1B is a schematic view of an automatic system for disassembly and assembly of plunger pumps and of a hydraulic end of the plunger pump, provided by at least one embodiment of the present disclosure.

Illustratively, FIG. 1A is a schematic view of an automatic system for disassembly and assembly of plunger pumps, provided by at least one embodiment of the present disclosure. FIG. 1B is a schematic view of a plurality of working components of an automatic system for disassembly and assembly of plunger pumps, provided by at least one embodiment of the present disclosure. FIG. 3A-3G are schematic views of the plurality of working components of the automatic system for disassembly and assembly of plunger pumps, provided by at least one embodiment of the present disclosure. As shown in FIGS. 1A-1B and FIGS. 3A-3G, the automatic system for disassembly and assembly of plunger pumps includes a plurality of working members 1, a first robotic arm 10, a first driver 11, and a second driver 12. The plurality of working members 1 include a rotary puller 1A/1B/1E, a lever 1F and at least one gripper 1G/2G/3G. The first robotic arm 10 includes a working end 10B and a connection end 10A opposite to the working end 10B; the first driver 11 is connected with the connection end 10A of the first robotic arm 10 and configured to drive the first robotic arm 10 to move in a three-dimensional space, the working end 10B of the first robotic arm 10 is configured to be detachably connectable with each of the plurality of working members 1, respectively, and the second driver 12 is configured to drive the working members connected with the working end 10B of the first robotic arm 10 to perform the disassembly and assembly of the plurality of function components. The automatic disassembly and assembly system and method for plunger pumps provided by the embodiments of the present disclosure take a shorter time to replace the components of the hydraulic end of the plunger pump. In particular, when replacing components that are very difficult to be disassembled, such as the valve seat spring sleeve, the valve seat and the plunger of the hydraulic end of the plunger pump, the effect of saving time and efforts is obvious and safety accidents can be avoided, such as hurting feet by a component and waist sprain of workers when replacing the components of the hydraulic end manually.

Figure 2:
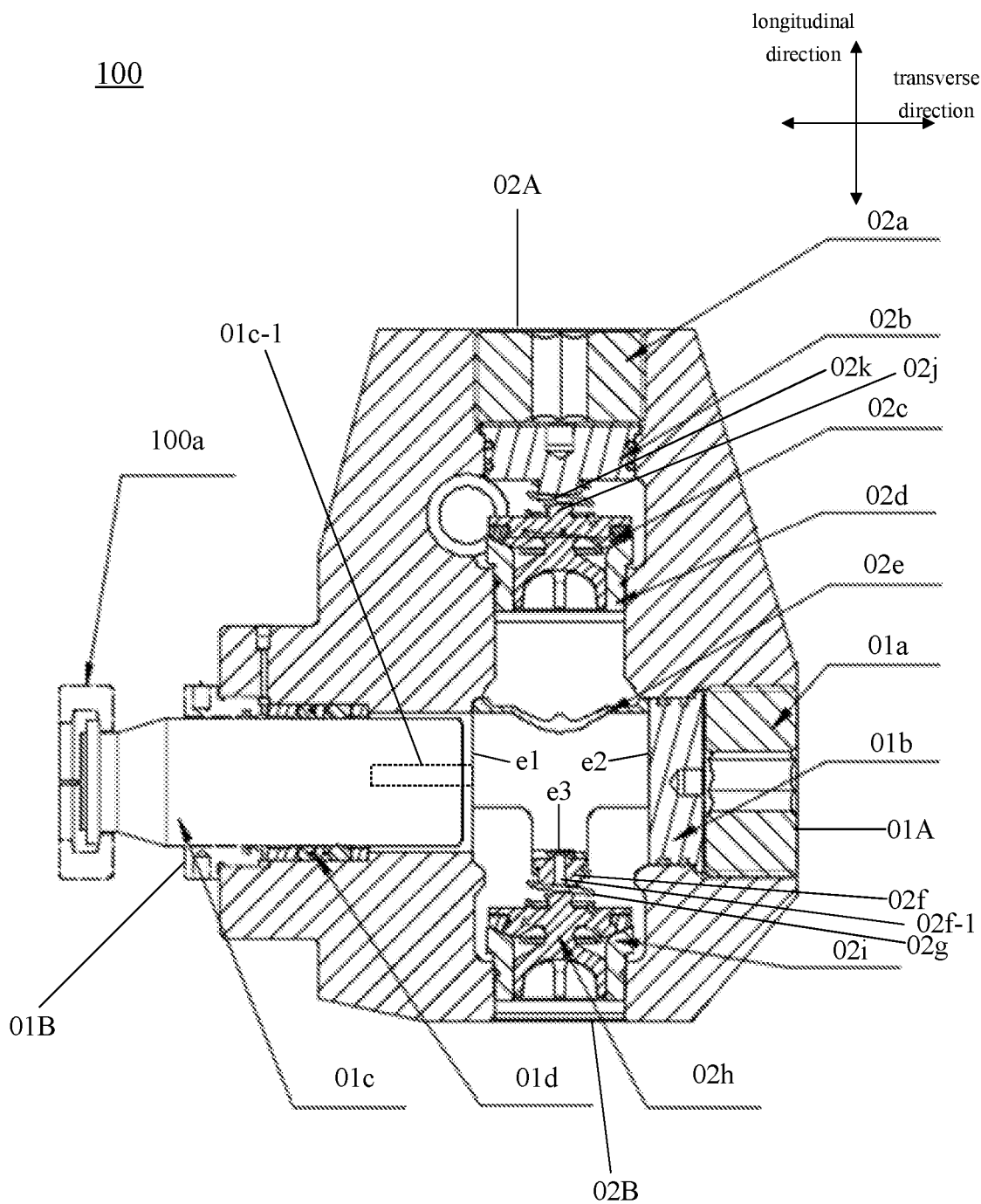
FIG. 2 is an enlarged schematic view of the hydraulic end of the plunger pump in Detail L in FIG. 1B.

As shown in FIGS. 1B-2, the plunger pump includes a hydraulic end 100 including a first cavity 01 and a plurality of first function components located in the first cavity 01, and the automatic system for disassembly and assembly of plunger pumps further includes a control system communicatively connected with the first and second drivers, respectively. The control system is configured to control the first driver to drive the first robotic arm 10 to move in the extension direction of the first cavity 01, and control the first robotic arm 10 to drive the plurality of working members to enter the first cavity 01 and be in matched connection with the plurality of first function components in the first cavity 01, respectively, so as to disassemble or assemble the plurality of first function components in the first cavity 01.

The control system may include a processor and a memory, and the processor may be, but is not limited to: a central processing unit, a single chip microcomputer, a microprocessor or a programmable logic device.

It is understandable that the memory may be either a volatile memory or a nonvolatile memory, or may include both volatile and nonvolatile memories. The non-volatile memory may be a Read-Only Memory (ROM), a programmable read-only memory (Programmable ROM, PROM), an erasable programmable read-only memory (Erasable PROM, EPROM), an electrically erasable programmable read-only memory (Electrically EPROM, EEPROM) or a flash memory. The volatile memory can be a random access memory (Random Access Memory, RAM), which is used as an external cache memory. The exemplary but not restrictive description indicates that various forms of RAMs may be used, such as static random access memory (Static RAM, SRAM), dynamic random access memory (Dynamic RAM, DRAM), synchronous dynamic random access memory (Synchronous DRAM, SDRAM), double data rate synchronous dynamic random access memory (Double Data Rate SDRAM, DDRSDRAM), enhanced synchronous dynamic random access memory (Enhanced SDRAM, ESDRAM), synchronous link dynamic random access memory (Synchlink DRAM, SLDRAM), and direct memory bus random access memory (Direct Rambus RAM, DRRAM). The memory is intended to include, without being limited to, these and any other suitable types of memories.

In some embodiments, the memory stores the following elements, executable modules or data structures, or subsets thereof, or supersets thereof: operating system and application programs, and corresponding execution modules such as an evaluation module and a judgement module, wherein the operating system includes various system programs, such as a framework layer, a core library layer and a driver layer, for implementing various basic services and processing hardware-based tasks. The application programs include various applications, such as media player and browser applications, and are used to implement various application services. The programs implementing the method provided in the embodiments of the present disclosure may be included in the application programs.

In some embodiments, the hydraulic end further includes a second cavity 02 and a plurality of second function components located in the second cavity 02, and the control system is further configured to control the first driver to drive the first robotic arm 10 to move in the extension direction of the second cavity 02, and to control the first robotic arm 10 to sequentially drive the plurality of working members to enter the second cavity 02 and be respectively in matched connection with the plurality of second function components in the second cavity 02 so as to disassemble or assemble the plurality of second function components in the second cavity 02.

In some embodiments, the second driver may be located at the working end 10B of the first robotic arm 10, including a motor, and may be detachably connected with the working end 10B of the first robotic arm 10. The second driver may be manually mounted to the working end 10B of the first robotic arm 10 before the plunger pump is disassembled or assembled; or, the working end 10B of the first robotic arm 10 includes a hollow shell and the second driver is located in the hollow shell of the working end 10B.

In some embodiments, the communication connection of the control system with the first driver and the second driver may be a wired connection or a wireless connection. For example, the control system may be disposed on the first robotic arm 10, e.g., in the hollow shell of the working end 10B, to facilitate a wired electrical connection with the first robotic arm 10, and a wire or a circuit board for electrically connecting the control system and the first robotic arm 10 may be disposed in the hollow shell of the working end 10B. The specific arrangement mode of the control system and the communication connection mode of the control system with the first driver and the second driver are not limited to the above-mentioned case in the present disclosure.

Referring to FIG. 2, in some embodiments, the first cavity 01 intersects and communicates with the second cavity 02, the first cavity 01 extends in a transverse direction, and the second cavity 02 extends in a longitudinal direction; the first cavity 01 has a first end 01A and a second end 01B that are opposite to each other in the transverse direction; the second cavity 02 has a first end 02A and a second end 02B that are opposite to each other in the longitudinal direction. For example, the longitudinal direction is perpendicular to the transverse direction. For example, in the operation state of the plunger pump, the first function components include a first pressure nut 01a, a first pressure cap 01b, and a plunger 01c. The first pressure nut 01a is located at the first end 01A of the first cavity 01; the plunger 01c extends in the transverse direction and is located at the second end 01B of the first cavity 01. The second function components include a second pressure nut 02a, a second pressure cap 02b, a first valve spring seat 02f, a first valve spring 02g, a first valve body 02h, a first valve body seat 02i, a valve spring seat sleeve 02e, a second valve spring seat 02j, a second valve spring 02k, a second valve body 02c, and a second valve body seat 02d. The second pressure nut 02a is located at the first end 02A of the second cavity 02; the valve spring seat sleeve 02e is located on a side of the plunger 01c in the transverse direction and has a hollow shell. The first valve spring seat 02f is detachably connected with the first valve spring 02g, and is longitudinally located on a side of the hollow shell close to the second end 02B of the second cavity 02; the valve spring seat sleeve 02e is located on a side of the plunger 01c in the transverse direction, and has a hollow shell clamped, for example, snap-fitted, at the intersection of the first cavity 01 and the second cavity 02; the first pressure cap 01b is in contact with the valve spring seat sleeve 02e; the first pressure cap 01b and the first pressure nut 01a seal the first end 01A of the first cavity 01, and fix the valve spring seat sleeve 02e together with the plunger 01c and the cavity wall. The hollow shell of the valve spring seat sleeve 02e has a right opening e2 facing the first end 01A of the first cavity 01, a left opening e1 facing the second end 01B of the first cavity 01 and a lower opening e3 facing the second end of the second cavity 02. The first valve spring 02g is sleeved on the first valve spring seat 02f and is retractable in the longitudinal direction. The first valve spring seat 02f is located on the side provided with the lower opening e3 of the hollow shell of the valve spring seat sleeve 02e, and has a through hole 02f-1 passing through the first valve spring seat 02f along the longitudinal direction, and the through hole 02f-1 communicates with the lower opening e3 of the first valve spring seat 02f. The first valve body 02h is mounted on the first valve body seat 02i. The second valve spring 02k is sleeved on the second valve spring seat 02j and is retractable in the longitudinal direction. The second valve body 02c is mounted on the second valve body seat 02d. For example, the second valve spring seat 02j and the second valve body 02c constitute an integral structure or are the second valve spring seat 02j and the second valve body separately provided; or, the second valve spring seat 02j and the first pressure cap 02b may constitute an integral structure or may be separately provided. The second pressure cap 02b is connected with the second valve spring seat 02j, and the second pressure nut 02a and the second pressure cap 02b seal the first end 02A of the second cavity 02 and fix the second valve spring seat 02j.

Of course, in some embodiments, the hydraulic end 100 of the plunger pump may include only the first cavity 01 or only the second cavity 02. Taking the case where the hydraulic end 100 of the plunger pump includes the first cavity 01 and the second cavity 02 shown in FIG. 2 as an example, the automatic system for disassembly and assembly of plunger pumps and the automatic disassembly and assembly method of the hydraulic end 100 of the plunger pump are described herein.

In some embodiments, the automatic system for disassembly and assembly of plunger pumps provided by at least one embodiment of the present disclosure further includes a detector, the detector is configured to acquire the operation state of the first function component or the second function component, and determine whether the first function component or the second function component needs to be disassembled according to the operation state thereof. The control system includes a loading control module configured to, in the case where the first function component or the second function component needs to be disassembled, control the working end of the first robotic arm to be detachably connected with the working member which is in matched connection with the first function component or the second function component that needs to be disassembled.

In some embodiments, the detector includes an image sensor device 16A and a judgement module; the image sensor device 16A is disposed at the working end of the first robotic arm 10, and is configured to acquire the image of the first function component or the second function component and transmit the image to the judgement module; the judgement module determines whether the first function component or the second function component needs to be disassembled according to the image. For example, the judgment module and the loading control module may include software or hardware. For example, as shown in FIG. 1B, the image sensor device 16A is disposed on the outer surface of the working end 10B of the first robotic arm 10 to facilitate acquiring the image of the first function component or the second function component. For example, the automatic system for disassembly and assembly of plunger pumps provided by at least one embodiment of the present disclosure includes a plurality of robotic arms, e.g., further including a second robotic arm 20 and a third robotic arm 30. For example, the second robotic arm 20 and the third robotic arm 30 are provided with an image sensor device 16B and an image sensor device 16C, respectively, so that the image of the first function component or the second function component can be acquired by each robotic arm.

In some embodiments, as shown in FIG. 1B, the first robotic arm 10 includes a joint 10a, and a first sub-arm 101 and a second sub-arm 102 that are connected via the joint 10a; for example, the first sub-arm 101 may rotate in a range of 0°~360° around the joint 10a. The second robotic arm 20 and the third robotic arm 30 also have such a similar structure as the first robotic arm 10.

The automatic disassembly and assembly method for plunger pumps provided by at least one embodiment of the present disclosure includes: driving the first robotic arm to move in a three-dimensional space by a first driver, in which the first robotic arm includes a working end and a connection end opposite to the working end, the first driver is connected with the working end of the first robotic arm, and the working end of the first robotic arm is configured to be detachably connectable with each of the plurality of working members, respectively; and driving the working members connected with the working end to operate by a second driving mechanism, in which the plurality of working members include a rotary puller, a lever and at least one gripper.

In some embodiments, the automatic plunger pump disassembly and assembly method further comprises: acquiring the operation state of the function component at the hydraulic end, and determining whether the function component needs to be disassembled according to the operation state thereof; and in the case where the functional member needs to be disassembled, detachably connecting the working member that matches with the function component that needs to be disassembled with the working end of the first robotic arm.

In some embodiments, the automatic disassembly and assembly method for plunger pumps further includes: controlling, by the control system, the first driver to drive the first robotic arm 10 to move in the extension direction of the first cavity 01, and controlling the first robotic arm 10 to sequentially drive the plurality of working members to enter the first cavity and be in matched connection with the plurality of first function components in the first cavity 01, respectively, so as to disassemble or assemble the plurality of first function components in the first cavity 01; and controlling, by the control system, the first driver to drive the first robotic arm 10 to move in the extension direction of the second cavity 02, and controlling the first robotic arm 10 to drive the plurality of working members to enter the second cavity 02 and be in matched connection with the plurality of second function components in the second cavity 02, respectively, so as to disassemble or assemble the plurality of second function components in the second cavity 02.

In some embodiments, the plunger pump comprises a plurality of cylinders, each of the plurality of cylinders comprises a first cavity 01 and/or a second cavity 02; the automatic disassembly and assembly method for plunger pumps further includes: determining a target cylinder in which the function component needs to be replaced from the plurality of cylinders, and determining a target function component that needs to be replaced in the target cylinder; selecting the target working member that matches the target function component from the plurality of working members, and detachably connecting the target working member with the working end of the first robotic arm; and controlling, by the control system, the movement of the first robotic arm to drive the target working member to move to the position of the target function component, and driving, by the second driver, the target working member to move and be in matched connection with the target function component, so as to disassemble the target function component.

FIGS. 4A-4G are schematic views of the plunger pump disassembled by an automatic system for disassembly and assembly of plunger pumps provided by at least one embodiment of the present disclosure. Referring to FIGS. 4A-4G, description is made to the automatic system for disassembly and assembly of plunger pumps and the disassembly and assembly method using the system provided by at least one embodiment of the present disclosure in the case where the function components in at least one cylinder at the hydraulic end 100 of the plunger pump needs to be replaced. It should be noted that in this embodiment, the method of disassembling the function components of the hydraulic end 100 of the plunger pump is taken for example. The assembly sequence of these function components is the reverse of the disassembling sequence thereof, the working mechanism of each component is the same as that in the case where the component is disassembled, if necessary, other working mechanisms are used for assistance, and each function component is installed at the original position.

The automatic disassembly and assembly method for plunger pumps further includes: acquiring the operation state of the function component at the hydraulic end, and determining whether the function component needs to be disassembled according to the operation state thereof; and in the case where the functional member needs to be disassembled, detachably connecting the working member that matches with the function component that needs to be disassembled to the working end of the first robotic arm.

Figure 3A:
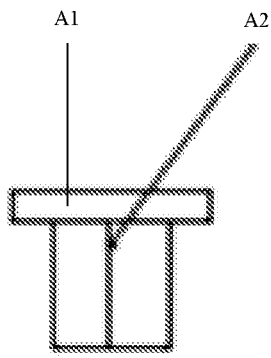
FIGS. 3A-3G are schematic views of an automatic system for disassembly and assembly of plunger pumps, provided by at least one embodiment of the present disclosure.
Figure 3B:
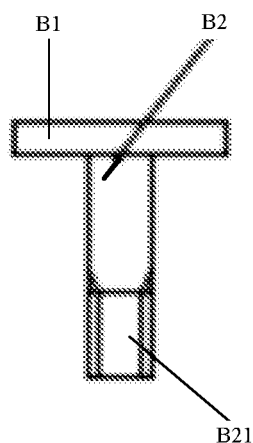

As shown in FIGS. 3A-3B, the rotary puller includes a first rotary puller 1A and a second rotary puller 1B. As shown in FIG. 3A, the first rotary puller 1A includes a first rotation pulling body A1 and a rod-shape first rotation pulling connection portion A2 connected with the first rotation pulling body A1. The first rotation pulling body A1 is configured to be detachably connectable with the working end 10B of the first robotic arm 10; the second driver further includes a rotation driver and a pulling driver. The rotation driver is configured to drive the rotation pulling body A1 and the rod-shape first rotation pulling connection portion A2 to rotate; the pulling driver is configured to drive the first rotary puller 1A to move.

Figure 4A:
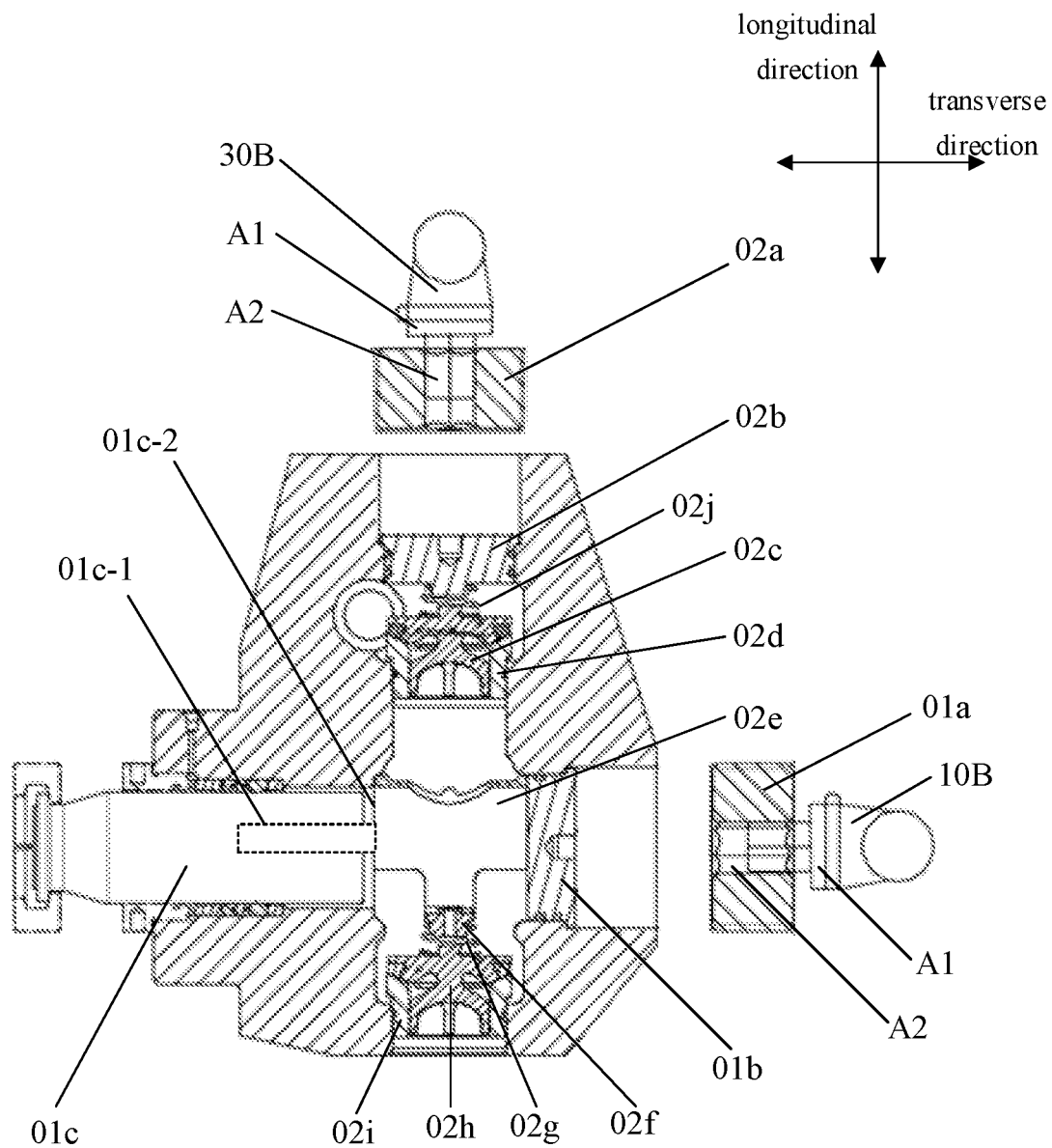
FIGS. 4A-4H are schematic views of disassembling the plunger pump by an automatic system for disassembly and assembly of plunger pumps, provided by at least one embodiment of the present disclosure.

As shown in FIG. 4A, the automatic plunger pump disassembly and assembly method comprises: detachably connecting the first rotation pulling body A1 with the working end of the first robotic arm 10; driving the first robotic arm 10 to move in a three-dimensional space by the first driver, and driving, by the rotation driver, the first rotation pulling body A1 and the rod-shape first rotation pulling connection portion A2 to rotate along a first rotation shaft parallel to the transverse direction, so as to make the rotation pulling connection portion to be in matched connection with the first disassembly connection portion of the first pressure nut 01a; and then, driving, by the rotation driver, the first rotation pulling body A1 and the rod-shape first rotation pulling connection portion A2 to rotate, and driving, by the pulling driver, the first rotary puller 1A to move, e.g., in the transverse direction, to disassemble the first pressure nut 01a from the first cavity (or installing the first pressure nut 01a into the first cavity in the assembly process).

Similarly, the first robotic arm 10 and the first rotary puller 1A may be used together to disassemble the second pressure nut 02a from the second cavity 02 or to assemble the second pressure nut 02a into the second cavity 02.

In some embodiments, the first rotation pulling connection portion A2 may be a rotatable hexagonal structure, and of course, may also be other polygonal prismatic structures. For example, the first disassembly connection portion is a hole channel, and the first rotation pulling connection portion A2 is complementary to the hole channel in shape.

In some embodiments, referring to FIG. 1B, the automatic system for disassembly and assembly of plunger pumps further includes a third robotic arm 30. The third robotic arm 30 includes a working end 30B and a connection end 30A opposite to the working end 30B, and the working end 30B of the third robotic arm 30 is configured to be detachably connected with each of the plurality of working members, respectively, and to drive the working member connected with the working end 30B of the third robotic arm 30 to work. For example, the specific structure of the third robotic arm 30 is the same as or similar to that of the first robotic arm 10, but the fixing positions of the connection ends of the third robotic arm 30 and the first robotic arm 10 are different. For example, the first function components located in the first cavity 01 may be disassembled and assembled by the first robotic arm 10, and at least some of the second function components located in the second cavity 02 (e.g., except the valve body spring sleeve) may be disassembled and assembled by the third robotic arm 30, such that the first robotic arm 10 and the third robotic arm 30 work for different cavities, respectively, thereby improving the disassembly efficiency.

In some embodiments, as shown in FIG. 1B, the connection end 10A of the first robotic arm 10 structure is fixed to a first plane 21, the connection end 30A of the third robotic arm 30 structure is fixed to a second plane 22, and for example, the first plane 21 is perpendicular to the second plane 22. For example, the first robotic arm 10 or the third robotic arm 30 may be used to disassemble and assemble the second pressure nut 02a located in the second cavity 02, so as to facilitate the operation. Of course, the spatial positions of the first robotic arm 10 and the third robotic arm 30 are flexible, and the positions of the first plane 21 and the second plane 22 are not limited to the case shown in FIG. 1B, as long as they can cooperate with the positions and extension directions of the first cavity 01 or the second cavity 02 respectively, and the embodiments of the present disclosure impose no limitation to this.

As shown in FIG. 3B, the second rotary puller 1B includes a second rotation pulling body B1 and a rod-shape second rotation pulling connection portion B2 connected with the second rotation pulling body B1. For example, the end B21 of the second rotation pulling connection portion B2 away from the second rotation pulling body B1 has a prismatic structure or an external thread. The second rotation pulling body B1 is configured to be detachably connectable with the working end of the second robotic arm; the second driver further includes: a rotation driver and a pulling driver. The rotation driver is configured to drive the second rotation pulling body B1 and the rod-shape second rotation pulling connection portion B2 to rotate; the pulling driver is configured to drive the second rotary puller 1B to move.

Figure 4B:
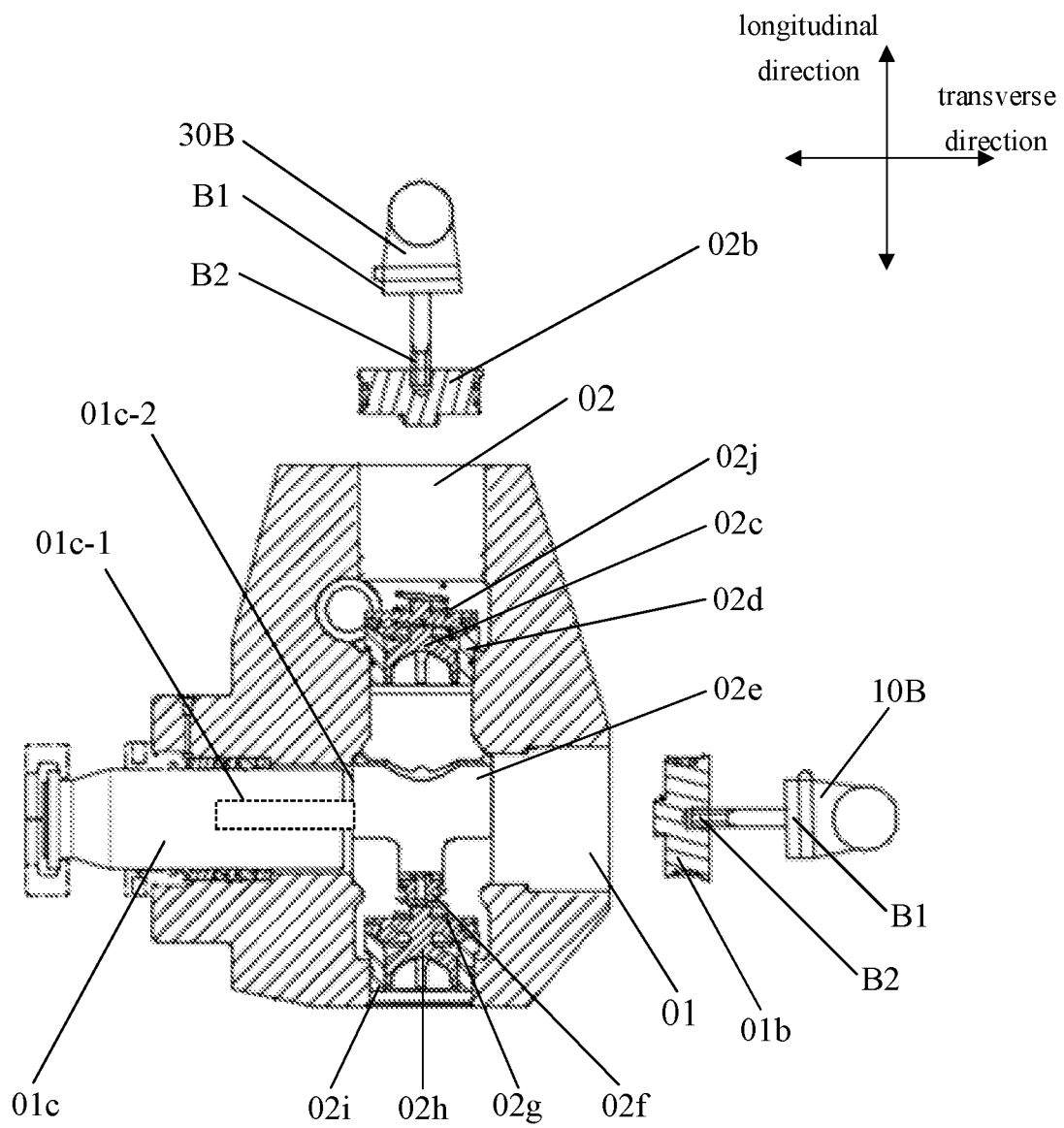

As shown in FIG. 4B, the automatic disassembly and assembly method for plunger pumps further comprises: detachably connecting the second rotation pulling body B1 and the working end of the first robotic arm 10; driving the first robotic arm 10 to move in a three-dimensional space by the first driver, and driving, by the rotation driver, the second rotation pulling body B1 and the rod-shape second rotation pulling connection portion B2 to rotate along a second rotation shaft parallel to the transverse direction, so as to make the rotation pulling connection portion to be in matched connection with the first disassembly connection portion of the first pressure cap 01b; and then, driving, by the rotation driver, the second rotation pulling body B1 and the rod-shape second rotation pulling connection portion B2 to rotate, and driving, by the pulling driver, the second rotary puller 1B to move, e.g., in the transverse direction, so as to disassemble the first pressure cap 01b from the first cavity (or, installing the first pressure cap 01b into the first cavity in the assembly process).

Similarly, the first robotic arm 10 and the first rotary puller 1A may be used together to disassemble the second pressure cap 02b from the second cavity 02 or assemble the second pressure cap 02b into the second cavity 02.

Figure 3C:
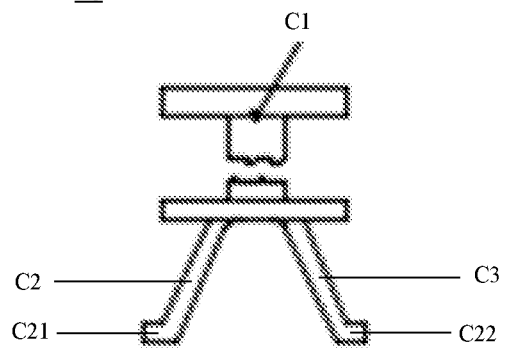
Figure 3D:
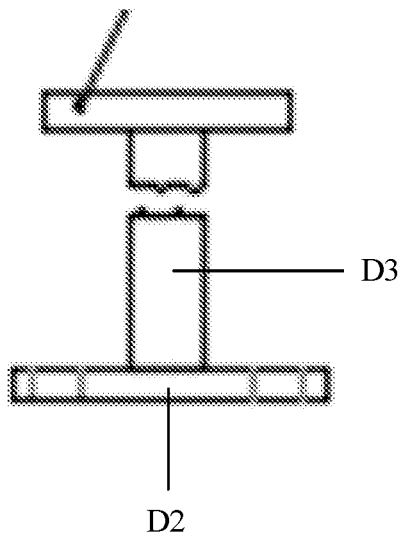
Figure 3E:
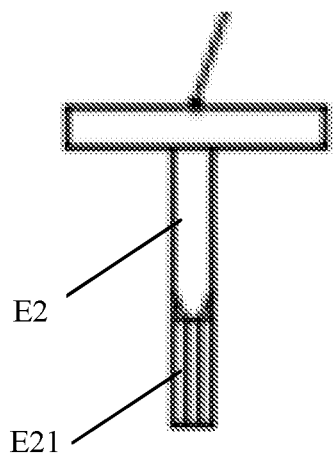
Figure 3F:
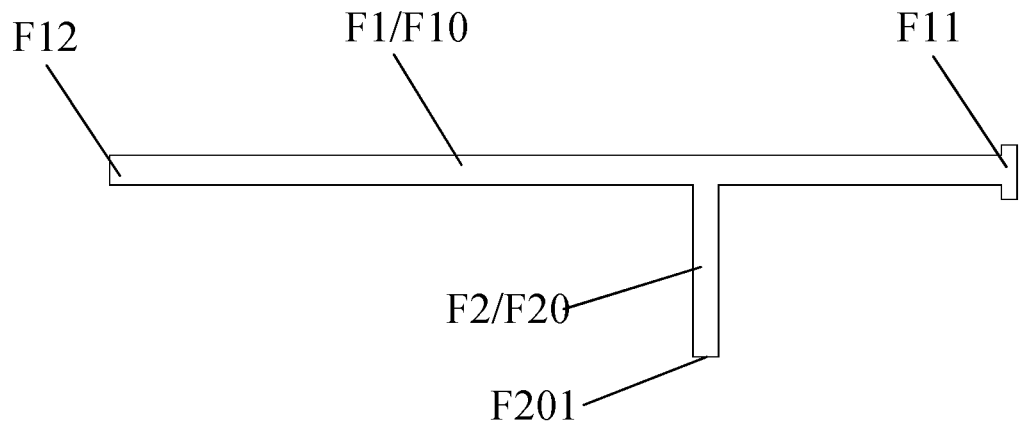

As shown in FIG. 3F, in some embodiments, the lever 1F includes a lever F1 and a rod-shape branch F2. The lever F1 includes a lever body F10 and a lever connection portion; the lever body F10 includes a first end F11 detachably connected with the working end of the first robotic arm 10 and a second end F12 opposite to the first end F11 of the lever body F10, and the lever connection portion is connected with the second end F12 of the lever body F10; the rod-shape branch F2 is connected with the lever body F10, extends in a direction perpendicular to the extension direction of the lever body F10, and includes a branch body F20 and a spring compression portion, the branch body F20 comprises a first end connected with the lever body F10 and a second end opposite to the first end of the branch body F20, and the spring compression portion is connected with the second end of the branch body F20, the spring compression portion has a pressure-exerting face F201 away from the lever body F10, the pressure-exerting face F201 is large enough to compress the hollow valve spring seat and the spring. The second driver includes a lever driver configured to drive the lever into a lever motion so as to drive the pressure-exerting face F201 to move.

Figure 4C:
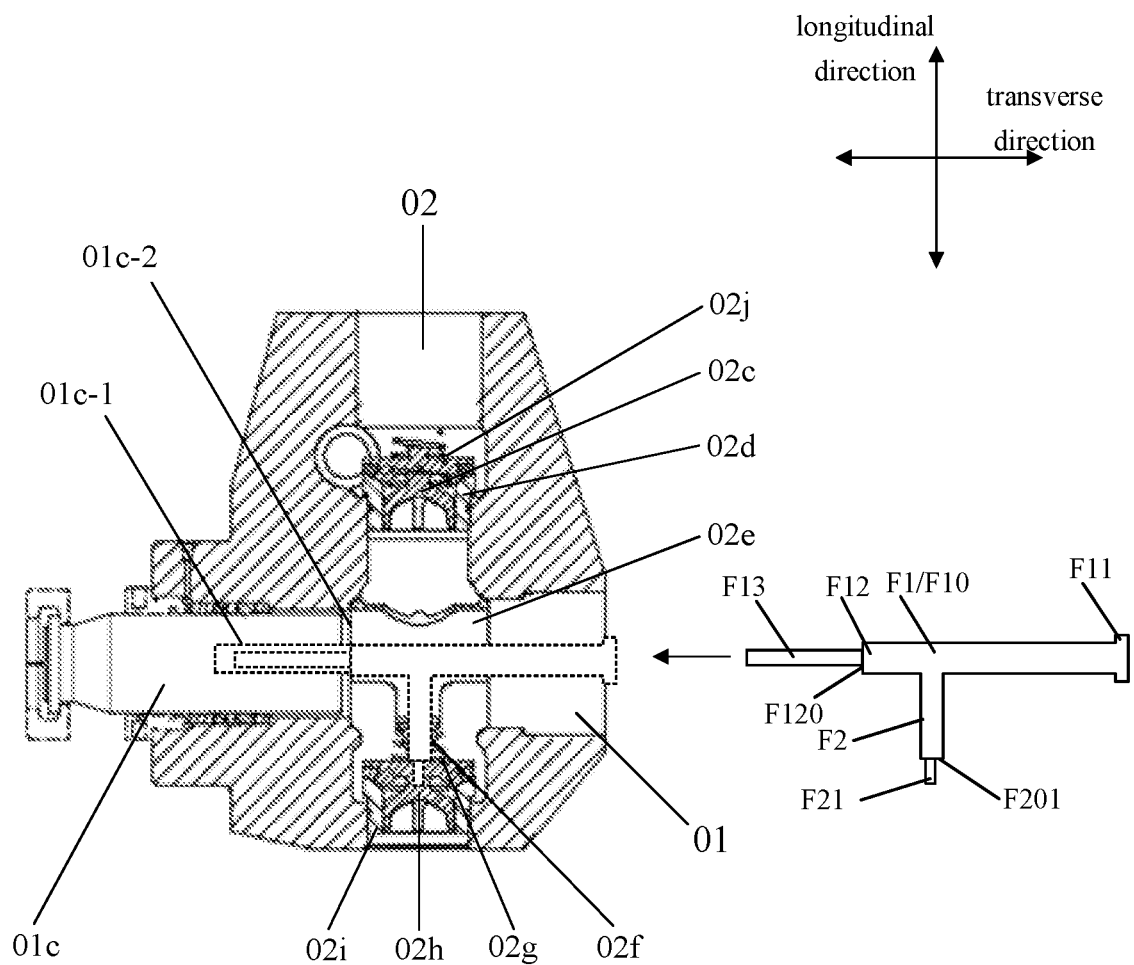

As shown in FIG. 4C, the automatic plunger pump disassembly and assembly method further comprises: detachably connecting the level member 1F to the working end of the first robotic arm 10; controlling, by the control system, the first robotic arm 10 to drive the lever 1F to move so that the lever body F10 passes through the hollow shell of the valve spring seat sleeve 02e, and the lever connection portion connects with the plunger 01c, and the rod-shape branch F2 passes through the hollow shell of the valve spring seat sleeve 02e in a vertical direction perpendicular to the extension direction of the lever body F10; and driving, by the lever driver, the lever connection portion to perform a lever motion with the position where the lever connection portion connects the plunger 01c as a fulcrum to drive the pressure-exerting face F201 to move in the longitudinal direction to press the first valve spring seat 02f and the first valve spring 02g in the longitudinal direction, so as to make the first valve spring seat 02f move in the longitudinal direction and compress the first valve spring 02g in the longitudinal direction, thereby separating the valve spring seat sleeve 02e from the first valve spring seat 02f. In the structure of the hydraulic end 100 of the plunger pump shown in FIG. 1B-2, because the valve spring seat sleeve 02e is clamped at the position where the first cavity 01 intersects with the second cavity 02 by the cavity wall of the first cavity 01 and the cavity wall of the second cavity 02, it is usually difficult for the valve spring seat sleeve 02e to be disassembled. By the above-mentioned method, the valve spring seat sleeve 02e can be automatically disassembled smoothly.

In some embodiments, referring to FIG. 1B, the automatic system for disassembly and assembly of plunger pumps further comprises a second robotic arm 20, the second robotic arm 20 includes a working end and a connection end opposite to the working end of the second robotic arm 20, and the at least one gripper includes a first gripper 1G detachably connectable with the working end 02B of the second robotic arm 20. The second driver includes a gripping driver, and the gripping driver is configured to drive the first gripper 1G to perform a gripping operation while the first robotic arm 10 drives the lever 1F to operate.

In some embodiments, the connection end 20A of the second robotic arm 20 is also fixed to the first plane 21. Of course, the connection end 20A of the second robotic arm structure may be fixed to other planes, and the embodiments of the present disclosure do not limit the position of the connection end 20A of the second robotic arm 20. In at least one embodiment, the connection end 20A of the second robotic arm 20 and the connection end 10A of the first robotic arm 10 may be the same connection end, and then separated from each other at the fixing end; for example, the second robotic arm 20 and the first robotic arm 10 are thinner than the third robotic arm 30 to facilitate the simultaneous entry of the second robotic arm 20 and the first robotic arm 10 into the first cavity 01 for operation.

In some embodiments, referring to FIG. 2 and FIG. 3F, the lever 1F enters the intersection of the first cavity 01 and the second cavity 02 via the first end of the first cavity 01, the lever body F10 passes through the hollow shell sequentially via the right opening e2 and the left opening e1 of the hollow shell to enable the lever connection portion to be in connection with the plunger 01c, and the rod-shape branch F2 passes through the lower opening e3 of the valve spring seat sleeve 02e along the longitudinal direction. For example, one end of the plunger 01c close to the first end 10A of the first cavity 10 has a plunger hole 01c-1, the lever connection portion enters the plunger hole 01c-1 and is complementary in shape to the plunger hole 01c-1 so as to improve the stability of the lever.

In some embodiments, the automatic disassembly and assembly method for plunger pumps method further comprises: detachably connecting the first gripper 1G with the working end of the second robotic arm; and while pressing the first valve spring seat 02f and the first valve spring 02g in the longitudinal direction by the pressure-exerting face F20, driving the first gripper 1G to grip the valve spring seat sleeve 02e by the gripping driver, and driving the first gripper 1G to move the valve spring seat sleeve 02e out of the hydraulic end by the second robotic arm.

Similarly, in the process of installing the valve spring seat sleeve 02e, the first robotic arm 10 may be controlled by the control system to drive the lever 1F to move so that the lever body F10 passes through the hollow shell of the valve spring seat sleeve 02e, and the lever connection portion is connected with the plunger 01c; the lever connection portion is driven by the lever driver to perform a lever movement with the position where the lever connection portion is connected with the plunger 01c as a fulcrum to drive the pressure-exerting face F201 to move in the longitudinal direction and to press the first valve spring seat 02f and the first valve spring 02g in the longitudinal direction, so as to enable the first valve spring seat 02f to move in the longitudinal direction and compress the first valve spring 02g in the longitudinal direction, thereby increasing the longitudinal space where the first cavity 01 and the second cavity 02 intersect; at the same time, the second robotic arm is controlled by the control system to drive the second gripper to grip the valve spring seat sleeve 02e sleeved on the lever body F10 and move the valve spring seat sleeve 02e to the target position, i.e., the position where the valve spring seat sleeve 02e is located before being disassembled as shown in FIG. 4C, so as to assemble the valve spring seat sleeve 02e to the target position.

In some embodiments, the second end F12 of the lever 1F shown in FIG. 3F may serve as the lever connection portion; the second end of the branch body F20 constitutes the spring compression portion, and the second end face F201 constitutes a pressure-exerting face F201 of the spring compression portion.

Figure 3G:
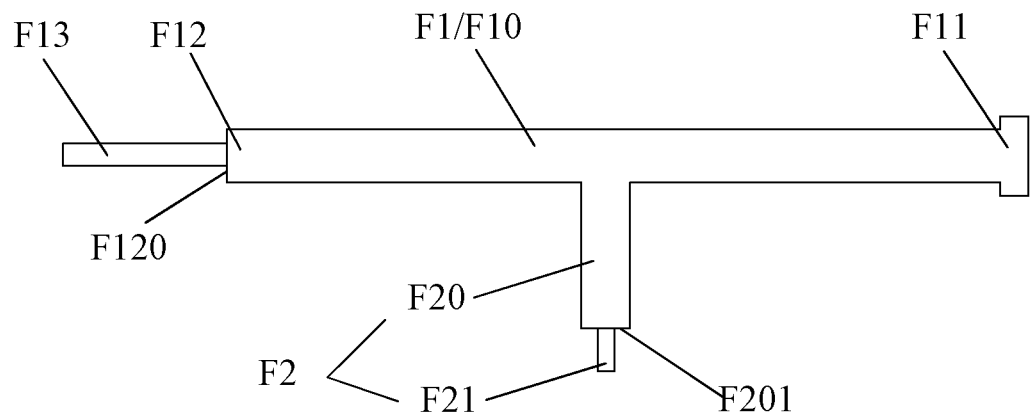

As another example, FIG. 3G is a schematic view of another lever 1F provided in at least one embodiment of the present disclosure. As shown in FIG. 3G, the second end of the lever body F10 has a first end face F120 away from the first end of the first robotic arm 10, the lever connection portion F13 is provided on the first end face F120 and has the same extension direction as the lever body F10, and the size, of the cross section of the lever connection portion F13 parallel to the first end face F120, is smaller than that of the first end face F120, so that first step structure is at a position where the lever connection portion F13 is connected with the lever body F10; the second end of the branch body F20 has a second end face F201 away from the lever body F10. Thus, the lever connection portion F13 enters the plunger hole 01c-1 and is complementary in shape to the plunger hole 01c-1, and the end face of the plunger 01c near the first end 01A of the first cavity 01 abuts the first end face F120, further improving the stability of the lever.

In some embodiments, the spring compression portion F21 is provided on the second end face F201, and the size of the cross section of the spring compression portion F21 parallel to the second end face F201 is smaller than that of the second end face F201 so that a second step structure is at a position where the spring compression portion F21 is connected with the branch body F20. In this way, in performing the step shown in FIG. 4C by the lever connection portion F13, the spring compression portion F21 can be inserted into the through hole 02f-1 of the first valve spring seat 02f to be better connected with the first valve spring seat 02f, so that the pressure-exerting face F20 of spring compression portion F21 the which presses the first valve spring seat 02f, is more stable, thereby making the operation of the spring compression more reliable.

As shown in FIG. 3C, the plurality of working members further include a puller 1C, the puller 1C includes a pulling body C1, and a first pulling portion C2 and a second pulling portion C that are connected with the pulling body C1; the pulling body C1 is configured to be detachably connected with the working end of the first robotic arm 10, the first pulling portion C2 has a first end connected with the pulling body C1 and a second end away from the pulling body C1, the second pulling portion C3 has a first end connected with the pulling body C1 and a second end away from the first end of the second pulling portion C1, and the first end of the first pulling portion C2 and the first end of the second pulling portion C3 are spaced apart from each other; the second end of the first pulling portion C2 has a first hook portion C21 bent in a direction away from the second pulling portion C3, and the second end of the second pulling portion C3 has a second hook portion C22 bent in a direction away from the first pulling portion C2; the second driver includes a pulling driver configured to drive the puller to move. Referring to FIG. 1B, the at least one gripper includes a second gripper 2G (second gripper 2G is provided in addition to the first gripper 1G, or the first gripper 1G serves as the second gripper) which is detachably connectable with the working end of the second robotic arm. The structure of the second gripper 2G is the same as the structure of the first gripper 1G, and the gripping openings of the second gripper 2G and the first gripper 1G are adjustable by a gripping drive structure under the control of the control system to be adapted to gripping function components of different sizes and shapes. Alternatively, the structure of the second gripper 2G is different from the structure of the first gripper 1G so that both of the two are adapted to the respective function components to be gripped.

Figure 4D:
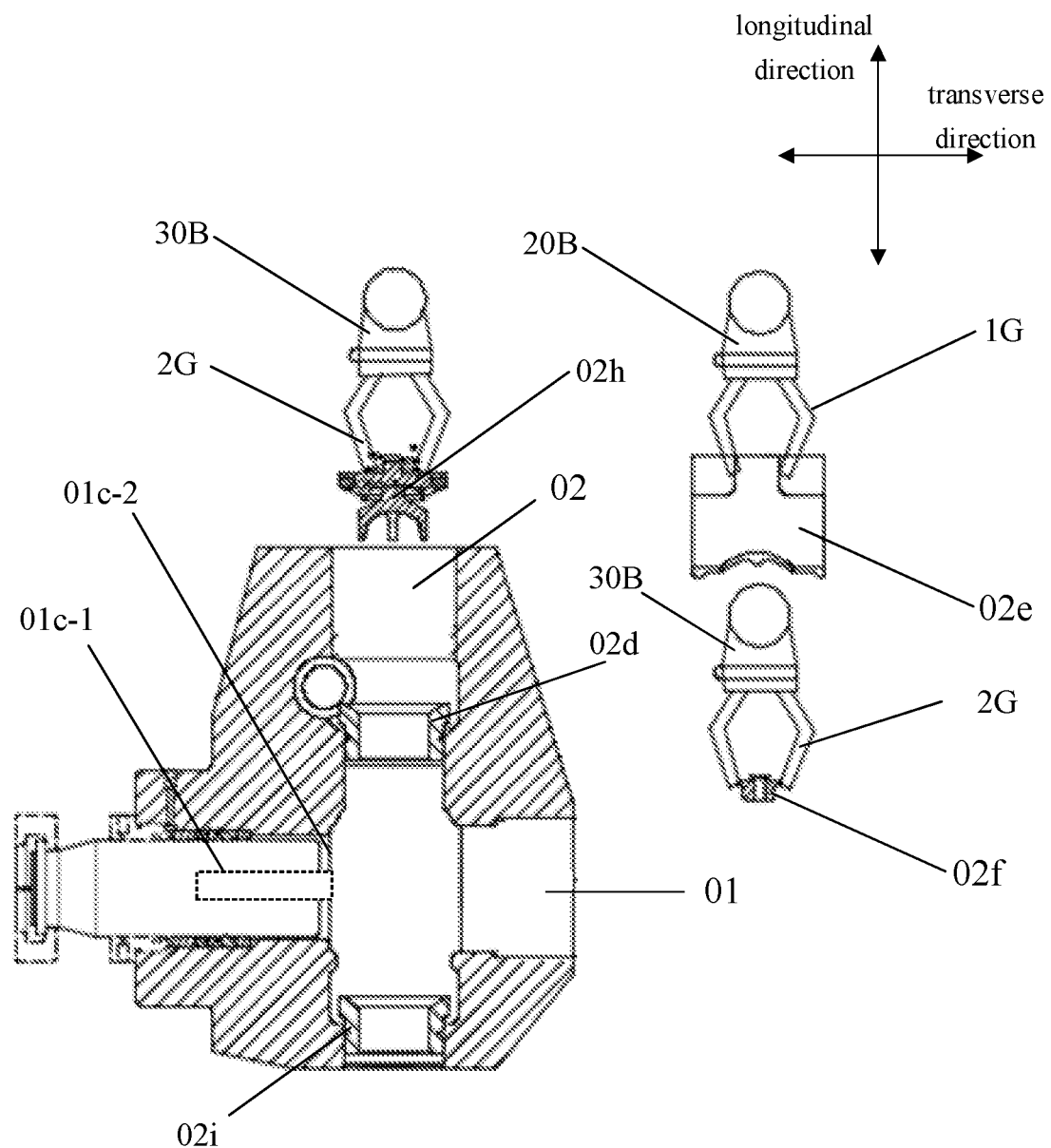
Figure 4E:
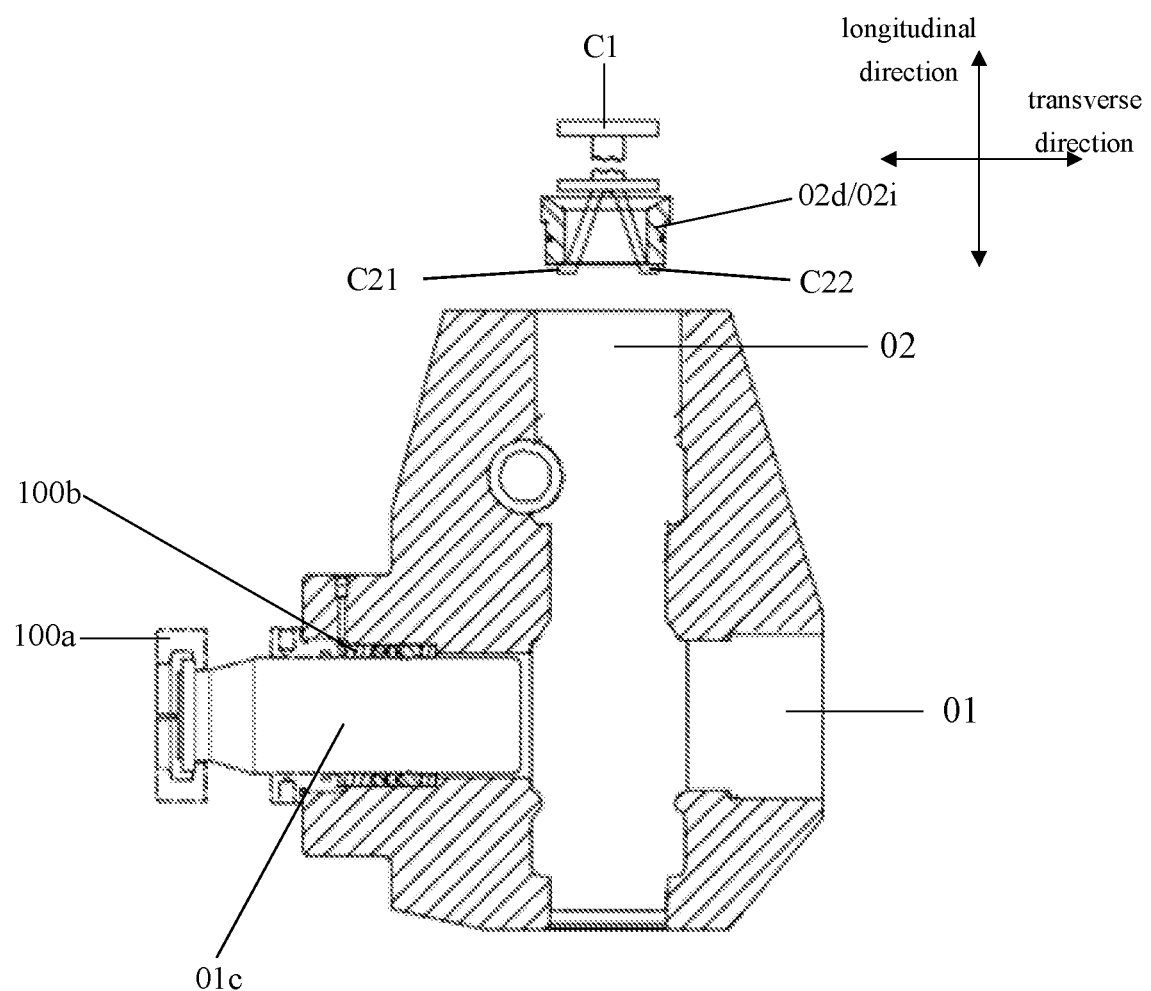

As shown in FIGS. 4D-4E, the different working members are sequentially connected with the working end of the third robotic arm 30, and the plurality of second function components are sequentially disassembled by controlling the movement of the third robotic arm 30 to control the working end of the third robotic arm 30 to move in the longitudinal direction in the second cavity 02 so as to enable different working members to be respectively in matched connection with the corresponding second function components. For example, the pulling body C1 is detachably connected with the working end 20B of the second robotic arm 20; the first hook portion C21 and the second hook portion C22 are driven by the movement of the second robotic arm 20 to be in matched connection with the first valve body 02h which is at a pre-set position, and the first hook portion C21 and the second hook portion C22 are driven by the pulling driver to apply a longitudinal tensile force to the first valve body 02h so as to disengage the first valve body 02h from the first valve body seat 02i, i.e., loosening the first valve body 02h; then, the puller 1C is disassembled from the working end 20B of the second robotic arm 20, and the second gripper is detachably connected with the working end 20B of the second robotic arm 20; the second gripper 2G is driven by the gripping driver to grip the first valve body 02h; and the first valve body spring seat 02j, the first valve body 02h and the first valve body seat 02i are respectively moved out of the second cavity 02 by driving the second robotic arm 20 to move. Successively and similarly, the second valve body seat 02d, the second valve body spring seat 02f, the second valve body 02c and the second valve body seat 02d are moved out of the second cavity 02 in a similar manner, for example, the above-mentioned structures are sequentially moved out of the second cavity 02.

In some embodiments, the second valve body spring seat 02j, the second valve body 02c, the second valve body seat 02d, the first valve body spring seat 02f, the first valve body 02h, and the first valve body seat 02i may be sequentially disassembled from top to bottom as shown in the drawing to ensure a smooth disassembly process. Alternatively, the second valve body seat 02d and the first valve body seat 02i may be disassembled after the first valve body spring seat 02j, the second valve body 02c, the first valve body spring seat 02f, and the first valve body 02h are sequentially disassembled.

For example, the plurality of working members may further include a prying member. For example, the control system may control the movement of the at least one third robotic arm 30 to connect the prying member with the working end 30B of the third robotic arm 30, and the prying member is controlled by the third robotic arm to enter the second cavity 02 and sequentially be in matched connection with the second valve body seat 02d and the first valve body seat 02i. For example, the second driver further includes a prying driver configured to drive the prying member to move to pry the second valve body seat 02d and the first valve body seat 02i. After the second valve body seat 02d and the first valve body seat 02i are pried, the second valve body seat 02d and the first valve body seat 02i are moved out of the second cavity 02 sequentially by using the second gripper 2G.

As shown in FIGS. 1B-2, in some embodiments, the first function components of the hydraulic end 100 of the plunger pump further includes a packing pressure nut 100a and a packing seal member 01d. The packing pressure nut 100a is used to fix the end of the plunger 01c away from the first end 01A of the first cavity 01, and the packing seal member 01d is used to seal the second end of the first cavity 01 to prevent oil in the first cavity 01 from leaking.

Figure 4F:
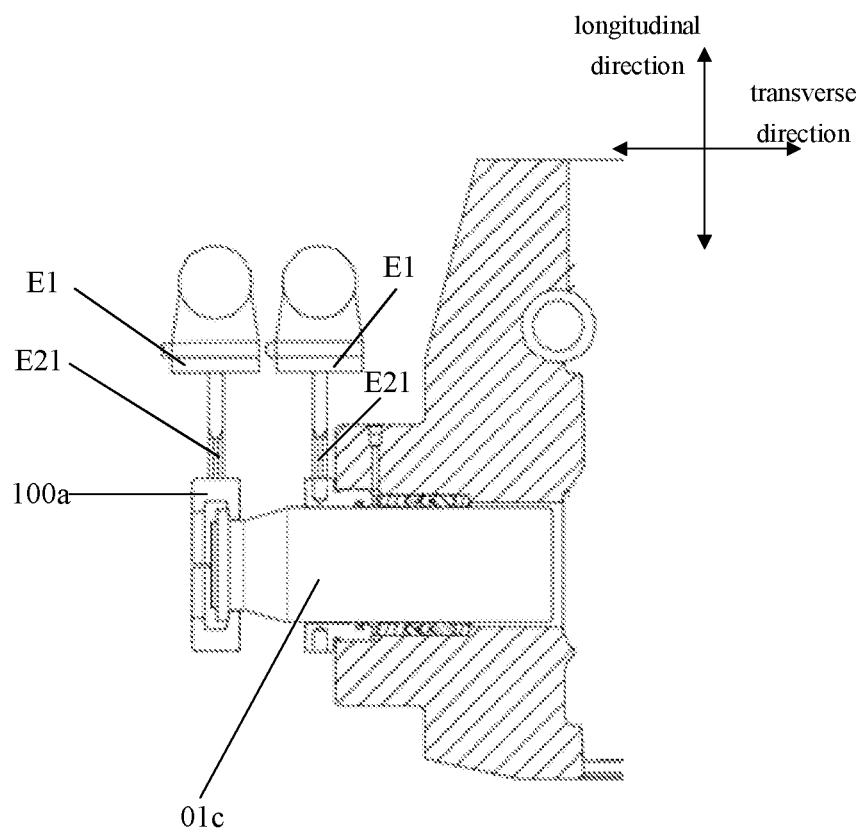

As shown in FIGS. 3E and 4F, the rotary puller further includes a third rotary puller 1E. As shown in FIG. 3E, the third rotary puller 1E includes a third rotation pulling body E1 and a rod-shape third rotation pulling connection portion E2 connected with the third rotation pulling body E1. The third rotation pulling body E1 is configured to be detachably connectable with the working end of the first robotic arm 10. The rotation driver is configured to drive the second rotation pulling body B1 and the rod-shape second rotation pulling connection portion B2 to rotate; the pulling driver is configured to drive the third rotary puller 1E to move. For example, the structure of the third rotary puller 1E may refer to the second rotary puller 1B, but the specifications of the two are different, and the third rotary puller 1E is used for matched connection with a detachable connection structure, such as an internal thread or the like, of the packing pressure nut 100a.

As shown in FIG. 4F, the automatic disassembly and assembly method for plunger pumps further comprises: detachably connecting the third rotation pulling body with the working end of the first robotic arm 10 (or other robotic arms such as the third robotic arm 30); driving the first robotic arm 10 to move in a three-dimensional space by a first driver, and driving, by the rotation driver, the third rotation pulling body E1 and the rod-shape third rotation pulling connection portion E2 to rotate so as to get the rotation pulling connection portion to be in matched connection with the disassembly connection portion of the packing pressure nut 100a; and then, driving the third rotation pulling body E1 and the rod-shape third rotation pulling connection portion E2 to rotate by the rotation driver, and driving the third rotary puller 1E to move by the pulling driver to disassemble the packing pressure nut 100a from the plunger 01c.

Figure 4G:
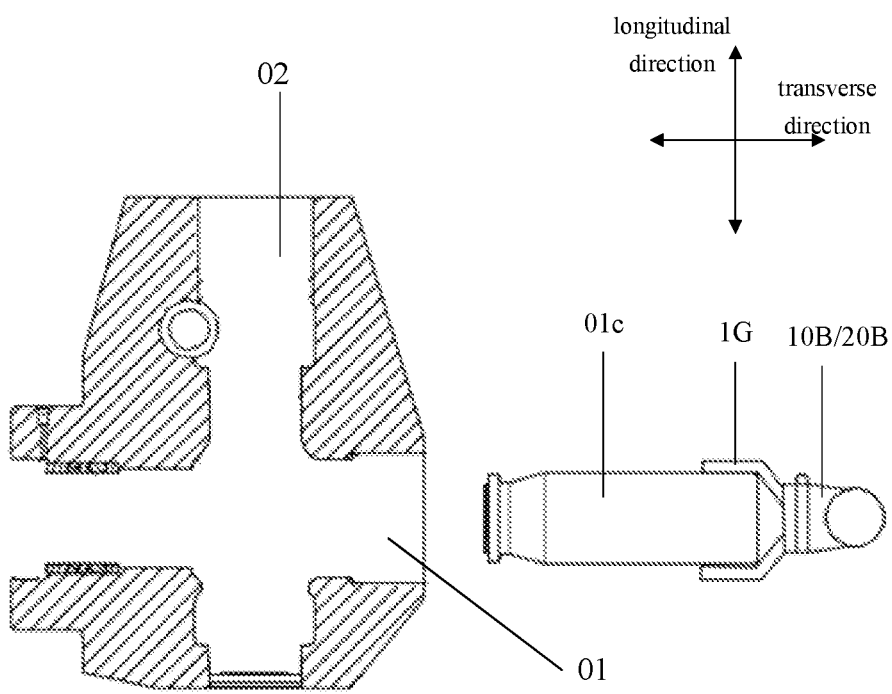

As shown in FIG. 4G, the automatic disassembly and assembly method for plunger pumps method further comprises: detachably connecting the first gripper 1G with the working end of the second robotic arm; and driving the first gripper 1G by the gripping driver to grip the plunger 01c, and driving the first gripper 1G by the second robotic arm to move the plunger 01c out of the first cavity 01.

As shown in FIG. 3D, the plurality of working members further include a push-pull member 1D. The push-pull member 1D includes a push-pull body D1, a push-pull connection portion D3, and a push-pull portion D2. The push-pull body D1 is configured to be detachably connectable with the working end of the robotic arm; the push-pull connection portion D3 has a first end connected with the push-pull body D1 and a second end away from the push-pull body D1; the push-pull portion D2 is connected with the push-pull connection portion D3, the direction from the first end of the connection portion to the second end of the push-pull connection portion D3 is the extension direction of the push-pull connection portion D3, and the push-pull portion D2 extends beyond the push-pull connection portion D3 in a direction perpendicular to the extension direction of the push-pull connection portion D3. The second driver includes a pulling driver configured to drive the puller 1D to move. For example, the push-pull driver and the pulling driver may be the same driver.

Figure 4H:
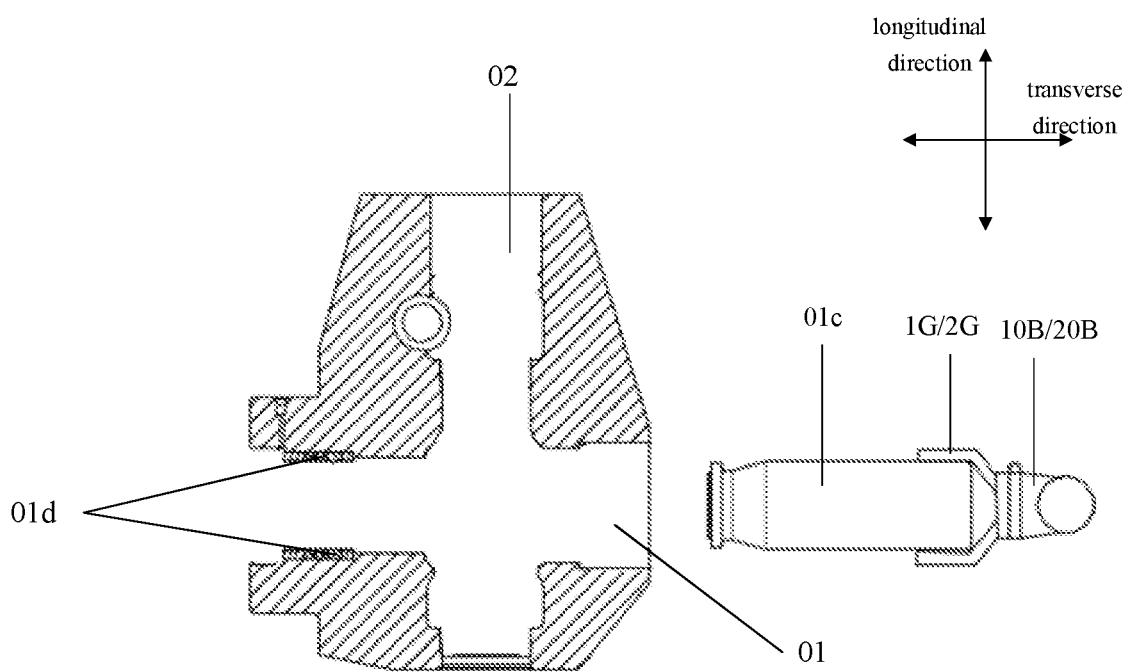

As shown in FIG. 4H, for replacing the packing seal member 01d, the automatic disassembly and assembly method for plunger pumps includes: detachably connecting the push-pull body D1 to the working end of the first robotic arm 10; and driving the first robotic arm 10 (or other robotic arms such as the third robotic arm 30) to move in a three-dimensional space by the first driver, and pushing the packing seal out of the first cavity 01 by driving the push-pull portion D2 by the pulling driver, so as to complete the disassembly of the hydraulic end 100 of the plunger pump.

In some embodiments, the push-pull body D1, the first rotation pulling body A1, the second rotation pulling body B1, the lever body F10, etc. and the corresponding second driver may be connected in a magnetic attraction manner or in other mechanical connection manners, and the embodiments of the present disclosure do not limit the mode of connection between the second driver and the corresponding working members.

In some embodiments, the automatic system for disassembly and assembly of plunger pumps further comprises an over-torque protection device, the over-torque protection device is communicatively connected with the control system and is configured to acquire a torque value generated when the rotary puller rotates, and to transmit the torque value to the control system, the control system comprises a processing module that receives the torque value and sends out an over-torque warning signal when the torque value reaches the torque warning value, and controls the over-torque protection device to drive the rotary puller to stop rotating. For example, the over-torque protection device may also acquire the number of rotation circles of the rotary puller or the image of the corresponding function component, and determine whether the function components driven thereby, such as the first pressure nut 01a and the second pressure nut 02a, are rotationally disassembled or rotationally assembled in place by means of the number of rotation circles of the rotary puller or a visual technique.

In some embodiments, the automatic system for disassembly and assembly of plunger pumps further comprises a pulling protection device, the pulling protection device is communicatively connected with the control system and is configured to acquire a pulling force value generated by the puller during the operation thereof, and when the pulling force value reaches a pulling force warning value, the pulling protection device sends out an over-pulling force warning signal and controls the puller to stop working; and/or the pulling protection device is further configured to acquire the pulling force value generated during the operation of the rotary puller, and when the pulling force value reaches the pulling force warning value, the pulling protection device sends out an over-pulling force warning signal and controls the puller to stop working. Alternatively, for example, the pulling protection device may acquire the length of the corresponding function component that is pulled out by the puller, or the image of such corresponding function component (e.g., the first pressure nut 01a, the second pressure nut 02a, the first pressure cap 01b, the second pressure cap 02b, the first valve body 02h, the second valve body 02c, etc.), and determine whether the disassembly of the corresponding function component is successful according to the pulling-out length of the corresponding function component or by a visual technique.

In some embodiments, in the disassembly process of the hydraulic end 100 of the plunger pump, the function components are disassembled in the disassembly sequence as shown in FIGS. 4A-4H, as the space is being freed by the disassembled function components, the image sensor device 16A of the automatic system for disassembly and assembly of plunger pumps may be used to perform detection while the disassembly is being performed, to see if the function components that have not been disassembled need to be replaced, thereby facilitating the accuracy of the detection results obtained by the image sensor device 16A, and avoiding unnecessary disassembly and assembly.

What have been described above are only specific implementations of the present disclosure, the protection scope of the present disclosure is not limited thereto. The protection scope of the present disclosure should be based on the protection scope of the claims.

What is claimed is:

1. An automatic system for disassembly and assembly of plunger pumps, comprising:
   a plurality of working members, comprising a rotary puller, a lever, and at least one gripper;
   a first robotic arm, comprising a working end and a connection end opposite to the working end, wherein the working end of the first robotic arm is configured to be detachably connectable with each of the plurality of working members;
   a first driver, connected with the connection end of the first robotic arm and configured to drive the first robotic arm to move in a three-dimensional space;
   a second driver, configured to drive the plurality of working members connected with the working end;
   a plunger pump for disassembly or assembly, wherein the plunger pump comprises a hydraulic end having a first cavity and a plurality of first function components disposed in the first cavity;
   a control system, communicatively connected with the first driver and the second driver; and
   a detector, configured to acquire an operation state of the first function components and determine whether at least one of the first function components needs to be disassembled according to the operation state,
   wherein in response to determining that the at least one of the first function components needs to be disassembled, the control system is configured to control the first driver to drive the first robotic arm to move in an extension direction of the first cavity, and to control the first robotic arm to drive at least one of the working members to enter the first cavity and be in matched connection with the at least one of the first function components in the first cavity, so as to disassemble the at least one of the first function components in the first cavity.

2. The automatic system for disassembly and assembly of plunger pumps according to claim 1, wherein:
   the hydraulic end further comprises a second cavity and a plurality of second function components disposed in the second cavity; and
   the control system is further configured to control the first robotic arm to drive the plurality of working members to enter the second cavity and respectively be in matched connection with the plurality of second function components in the second cavity, so as to disassemble or assemble the plurality of second function components in the second cavity.

3. The automatic system for disassembly and assembly of plunger pumps according to claim 2, wherein:
   the detector is configured to acquire an operation state of the second function components and determine whether the second function components need to be disassembled according to the operation state of the second function components, wherein:
   the control system is configured to, when the second function components need to be disassembled, control the working end of the first robotic arm to be detachably connected with the working members that are in matched connection with the second function components.

4. The automatic system for disassembly and assembly of plunger pumps according to claim 3, wherein:
   the detector comprises an image sensor device and a processor;
   the image sensor device is arranged at the working end of the first robotic arm, and is configured to acquire an image of the first function components or the second function components and transmit the image to the processor; and
   the processor determines whether the first function components or the second function components need to be disassembled according to the image.

5. The automatic system for disassembly and assembly of plunger pumps according to claim 1, wherein the lever comprises:
   a lever portion, comprising a lever body and a lever connection portion, wherein the lever body comprises a first end detachably connectable with the working end of the first robotic arm and a second end opposite to the first end of the lever body, and the lever connection portion is connected with the second end of the lever body; and
   a rod-shape branch connected with the lever body, extending in a direction perpendicular to an extension direction of the lever body, and comprising a branch body and a spring compression portion, wherein the branch body comprises a first end connected with the lever body and a second end opposite to the first end of the branch body, the spring compression portion is connected with the second end of the branch body, the spring compression portion has a pressure-exerting face away from the lever body,
   wherein the second driver comprises a lever driver configured to drive the lever portion into a lever motion so as to drive the pressure-exerting face to move.

6. The automatic system for disassembly and assembly of plunger pumps according to claim 5, wherein:
   the second end of the lever body has a first end face away from the first robotic arm;
   the lever connection portion is on the first end face and has a same extension direction as an extension of the lever body;
   a size of a cross section of the lever connection portion parallel to the first end face is smaller than a size of the first end face, so that a first step structure is at a position where the lever connection portion is connected with the lever body;
   the second end of the branch body has a second end face away from the lever body;
   the second end of the branch body constitutes the spring compression portion; and
   the second end face constitutes the pressure-exerting face of the spring compression portion.

7. The automatic system for disassembly and assembly of plunger pumps according to claim 6, wherein:
   the spring compression portion is on the second end face; and
   a size of a cross section of the spring compression portion parallel to the second end face is smaller than a size of the second end face, so that a second step structure is at a position where the spring compression portion is connected with the branch body.

8. The automatic system for disassembly and assembly of plunger pumps according to claim 5, further comprising:
   a second robotic arm, comprising a working end and a connection end opposite to the working end of the second robotic arm, wherein the at least one gripper comprises a first gripper detachably connectable with the working end of the second robotic arm; and
   the second driver comprises a gripping driver configured to drive the first gripper to perform a gripping operation while the first robotic arm drives the lever to work.

9. The automatic system for disassembly and assembly of plunger pumps according to claim 8, further comprising:
   a third robotic arm, comprising a working end and a connection end opposite to the working end, wherein:
      a position of the connection end of the third robotic arm is different from a position of the connection end of the first robotic arm, and
      the working end of the third robotic arm is configured to be detachably connectable with each of the plurality of working members, and is configured to drive the working members connected with the working end of the third robotic arm to operate.

10. The automatic system for disassembly and assembly of plunger pumps according to claim 1, wherein:
   the plurality of working members further comprise a puller;
   the puller comprises a pulling body, a first pulling portion, and a second pulling portion;
   the first pulling portion and the second pulling portion are connected with the pulling body;
   the pulling body is configured to be detachably connectable with the working end of the first robotic arm;
   the first pulling portion has a first end connected with the pulling body and a second end away from the pulling body;
   the second pulling portion has a first end connected with the pulling body and a second end away from the pulling body;
   the first end of the first pulling portion and the first end of the second pulling portion are spaced apart from each other;
   the second end of the first pulling portion has a first hook portion bent in a direction away from the second pulling portion;
   the second end of the second pulling portion has a second hook portion bent in a direction away from the first pulling portion; and
   the second driver comprises a pulling driver configured to drive the puller to move.

11. The automatic system for disassembly and assembly of plunger pumps according to claim 10, wherein:
   the rotary puller comprises a rotation pulling body and a rod-shape rotation pulling connection portion connected with the rotation pulling body;
   the rotation pulling body is configured to be detachably connectable with the working end of the first robotic arm; and
   the second driver further comprises:
      a rotation driver, configured to drive the rotation pulling body and the rod-shape rotation pulling connection portion to rotate; and
      a pulling driver, configured to drive the rotary puller to move.

12. The automatic system for disassembly and assembly of plunger pumps according to claim 1, wherein:
   the plurality of working members further comprise a push-pull member;
   the push-pull member comprises:
      a push-pull body, configured to be detachably connectable with the working end of the first robotic arm;
      a push-pull connection portion, having a first end connected with the push-pull body and a second end away from the push-pull body; and
      a push-pull portion, connected with the push-pull connection portion, wherein a direction from the first end of the push-pull connection portion to the second end of the push-pull connection portion is an extension direction of the push-pull connection portion, and the push-pull portion extends beyond the push-pull connection portion in a direction perpendicular to the extension direction of the push-pull connection portion; and
   the second driver comprises a push-pull driver configured to drive the push-pull member to move.

13. An automatic disassembly and assembly method for plunger pumps, comprising:
   driving, by a first driver, a first robotic arm to move in a three-dimensional space, wherein:
      the first robotic arm comprises a working end and a connection end opposite to the working end,
      the first driver is connected with the connection end of the first robotic arm, and
      the working end of the first robotic arm is configured to be detachably connectable with each of a plurality of working members;
   driving, by a second driver, the working members connected with the working end to operate, wherein the plurality of working members comprise a rotary puller, a lever, and at least one gripper;
   controlling, by a control system, the first driver to drive the first robotic arm to move in an extension direction of a first cavity of a hydraulic end of a plunger pump, wherein the hydraulic end comprises a function mechanism comprising a plurality of first function components disposed in the first cavity;
   controlling the first robotic arm to drive the plurality of working members to enter the first cavity and be in matched connection with the plurality of first function components in the first cavity, so as to disassemble or assemble the plurality of first function components in the first cavity.

14. The automatic disassembly and assembly method for plunger pumps according to claim 13, wherein:
   the function mechanism further comprises a plurality of second function components;
   the hydraulic end further comprises a second cavity;
   the plurality of second function components are in the second cavity; and
   the method further comprises:
      controlling, by the control system, the first driver to drive the first robotic arm to move in an extension direction of the second cavity, and
      controlling the first robotic arm to drive the plurality of working members into the second cavity and be in matched connection with the plurality of second function components in the second cavity, respectively, so as to disassemble or assemble the plurality of second function components in the second cavity.

15. The automatic disassembly and assembly method for plunger pumps according to claim 14, wherein:
   the plunger pump comprises a plurality of cylinders;
   each of the plurality of cylinders comprises the first cavity and/or the second cavity; and
   the method further comprises:
      determining, from the plurality of cylinders, a target cylinder of which a target function component needs to be replaced;
      determining the target function component that needs to be replaced in the target cylinder;
      selecting a target working member that matches the target function component from the plurality of working members;
      detachably connecting the target working member with the working end of the first robotic arm;

controlling, by the control system, movement of the first robotic arm to drive the target working member to move to a position of the target function component; and driving, by the second driver, the target working member to move and be in matched connection with the target function component, so as to disassemble the target function component.

16. The automatic disassembly and assembly method for plunger pumps according to claim 14, wherein:
in an operation state of the plunger pump, the function mechanism comprises:
a plunger, extending in a transverse direction;
a valve spring seat sleeve, on a side of the plunger in the transverse direction and having a hollow shell;
a first valve spring seat, detachably connected with the valve spring seat sleeve and on a side of the hollow shell in a longitudinal direction, wherein the longitudinal direction is perpendicular to the transverse direction; and
a first valve spring, sleeved on the first valve spring seat and retractable in the longitudinal direction;
the second driver comprises a lever driver;
the lever comprises:
a lever portion, comprising a lever body and a lever connection portion, wherein the lever body comprises a first end detachably connectable with the working end of the first robotic arm and a second end opposite the first end of the lever body, and the lever connection portion is connected with the second end of the lever body; and
a rod-shape branch which is connected with the lever body, extends in a vertical direction perpendicular to an extension direction of the lever body, and comprises a branch body and a spring compression portion, wherein the branch body comprises a first end connected with the lever body and a second end opposite to the first end of the branch body, and the spring compression portion is connected with the second end of the branch body, and has a pressure-exerting face away from the lever body;
the method comprises:
detachably connecting the lever with the working end of the first robotic arm;
controlling, by the control system, the first robotic arm to drive the lever to move so that the lever body passes through the hollow shell of the valve spring seat sleeve, wherein the lever connection portion is connected with the plunger, and the rod-shape branch passes through the hollow shell of the valve spring seat sleeve in the vertical direction perpendicular to the extension direction of the lever body; and
driving, by the lever driver, the lever connection portion to perform a lever motion with a position where the lever connection portion connects with the plunger as a fulcrum to drive the pressure-exerting face to move in the longitudinal direction to press the first valve spring seat and the first valve spring in the longitudinal direction, so as to make the first valve spring seat move in the longitudinal direction and compress the first valve spring in the longitudinal direction, so that the valve spring seat sleeve is separated from the first valve spring seat;
the at least one gripper comprises a first gripper;
the second driver comprises a gripping driver; and
the method further comprises:
detachably connecting the first gripper with the working end of a second robotic arm; and
while the pressure-exerting face presses the first valve spring seat and the first valve spring in the longitudinal direction, driving, by the gripping driver, the first gripper to grip the valve spring seat sleeve, and driving, by the second robotic arm, the first gripper to move the valve spring seat sleeve out of the hydraulic end.

17. The automatic disassembly and assembly method for plunger pumps according to claim 16, wherein:
the first cavity and the second cavity intersect and communicate with each other;
the first cavity extends in the transverse direction;
the second cavity extends in the longitudinal direction;
the first cavity has a first end and a second end that are opposite to each other in the transverse direction;
the second cavity has a first end and a second end that are opposite to each other in the longitudinal direction;
in the operation state of the plunger pump, the second function components comprise:
a second pressure nut, at the first end of the second cavity;
the valve spring seat sleeve, clamped at an intersection of the first cavity and the second cavity, wherein the hollow shell has a right opening facing the first end of the first cavity, a left opening facing the second end of the first cavity and a lower opening facing the second end of the second cavity;
the first valve spring seat which is on a side of the hollow shell having the lower opening, and has a through hole passing through the first valve spring seat along the longitudinal direction, wherein the through hole communicates with the lower opening of the valve spring seat sleeve; and
the first valve spring; and
the lever enters into the intersection of the first cavity and the second cavity via the first end of the first cavity, the lever body passes through the hollow shell sequentially via the right opening and the left opening of the hollow shell so that the lever connection portion connects with the plunger, and the rod-shape branch passes through the lower opening of the valve spring seat sleeve in the longitudinal direction.

* * * * *